(12) United States Patent
Singh et al.

(10) Patent No.: US 12,211,482 B1
(45) Date of Patent: Jan. 28, 2025

(54) CONFIGURING APPLICATIONS FOR SPEECH PROCESSING

(71) Applicant: Amazon Technologies, Inc., Seattle, WA (US)

(72) Inventors: Veer Yuganter Singh, Seattle, WA (US); Akshai Prabhu, Toronto (CA); Pravin Thiagalingam, Caledon (CA); Oliver Sinsik Chiu, Etobicoke (CA)

(73) Assignee: Amazon Technologies, Inc., Seattle, WA (US)

( * ) Notice: Subject to any disclaimer, the term of this patent is extended or adjusted under 35 U.S.C. 154(b) by 303 days.

(21) Appl. No.: 17/956,400

(22) Filed: Sep. 29, 2022

(51) Int. Cl.
*G10L 13/02* (2013.01)
*G10L 15/22* (2006.01)

(52) U.S. Cl.
CPC .............. *G10L 13/02* (2013.01); *G10L 15/22* (2013.01); *G10L 2015/223* (2013.01)

(58) Field of Classification Search
CPC ..... G10L 13/02; G10L 15/22; G10L 15/1822; G10L 2015/223
See application file for complete search history.

(56) References Cited

U.S. PATENT DOCUMENTS 11,355,112 B1\* 6/2022 Pahwa ................... G06F 3/167
2022/0020357 A1\* 1/2022 Rastrow ............. G10L 15/1822

\* cited by examiner

*Primary Examiner* — Yogeshkumar Patel
(74) *Attorney, Agent, or Firm* — Pierce Atwood LLP

(57) ABSTRACT

A system that determines which applications operating on a device are capable of processing speech processing results. As applications are added or removed, the device may update its own registry information as well as registry information for a remote system, thus ensuring continuity between a local speech processing pipeline and a remote speech processing pipeline. When speech processing is performed, the system can send the results to a corresponding application operating on a local device for further operation, execution, or the like.

20 Claims, 17 Drawing Sheets

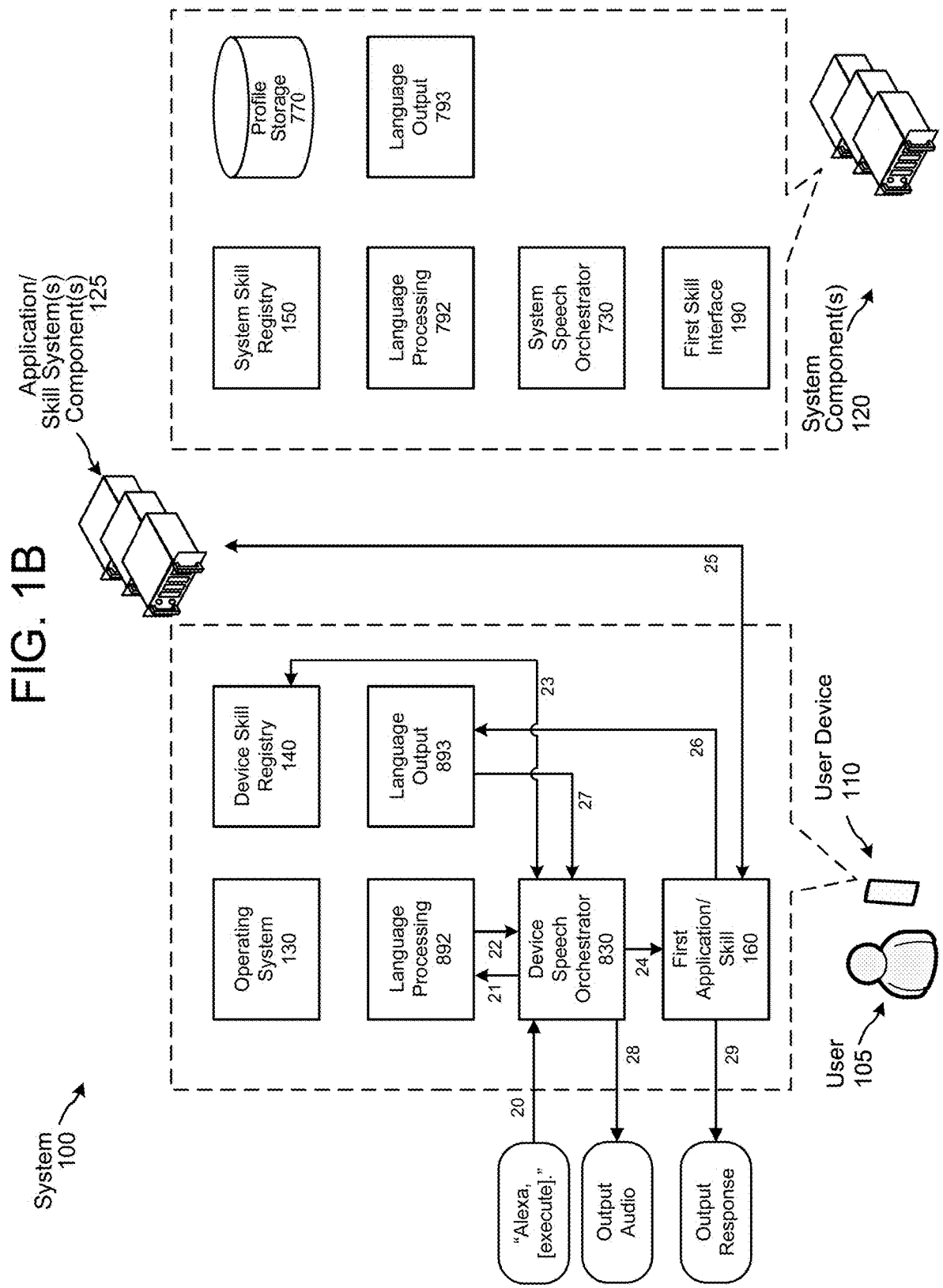

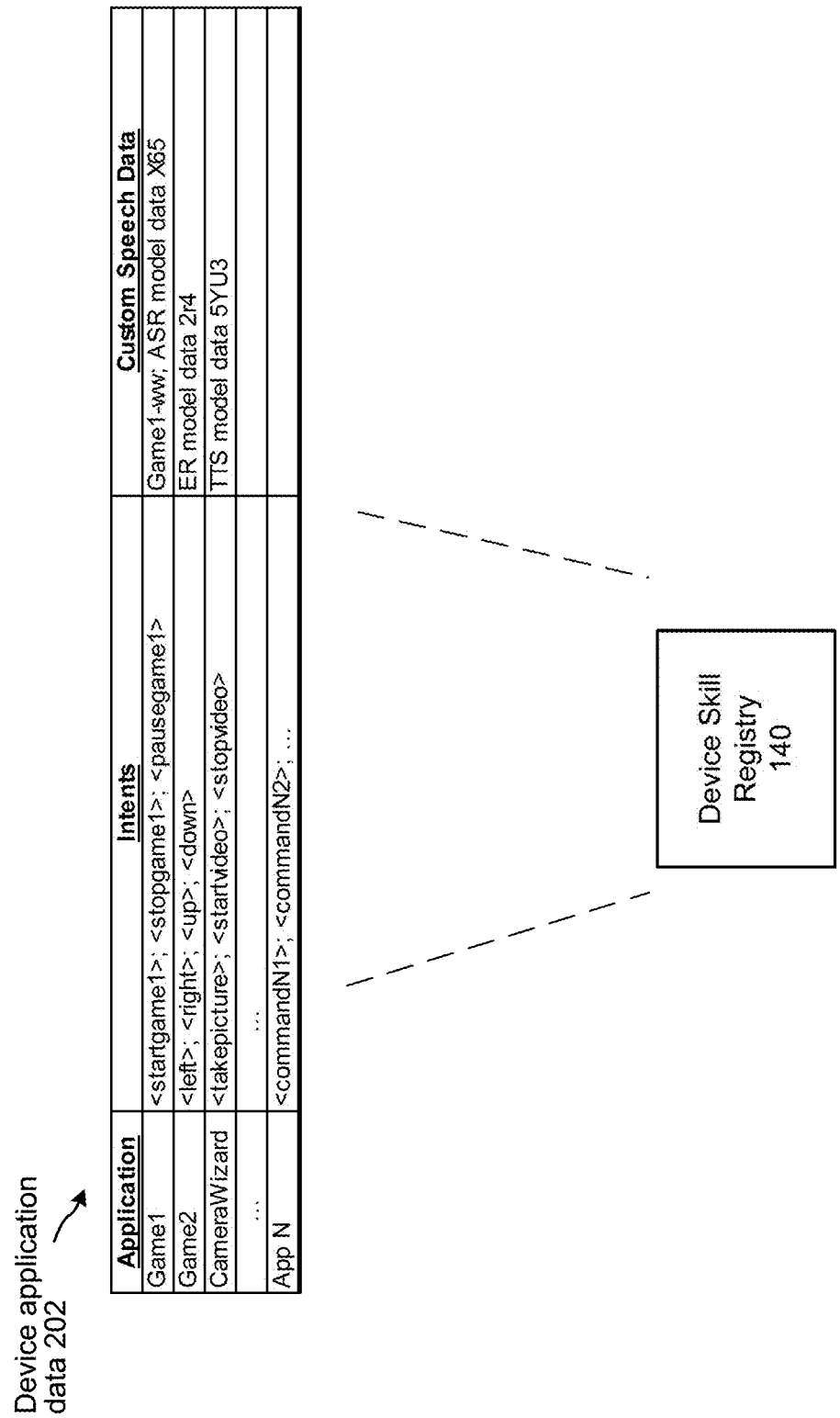

CONFIGURING APPLICATIONS FOR SPEECH PROCESSING

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. Speech recognition and natural language understanding processing techniques may be referred to collectively or separately herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIGS. 1B-1C illustrate a conceptual diagram of a system configured to perform speech processing using on-device application(s) acting as a speech-processing skill endpoint according to embodiments of the present disclosure.

FIG. 2 illustrates data stored by a device skill registry according to embodiments of the present disclosure.

DETAILED DESCRIPTION

Figure 1A:
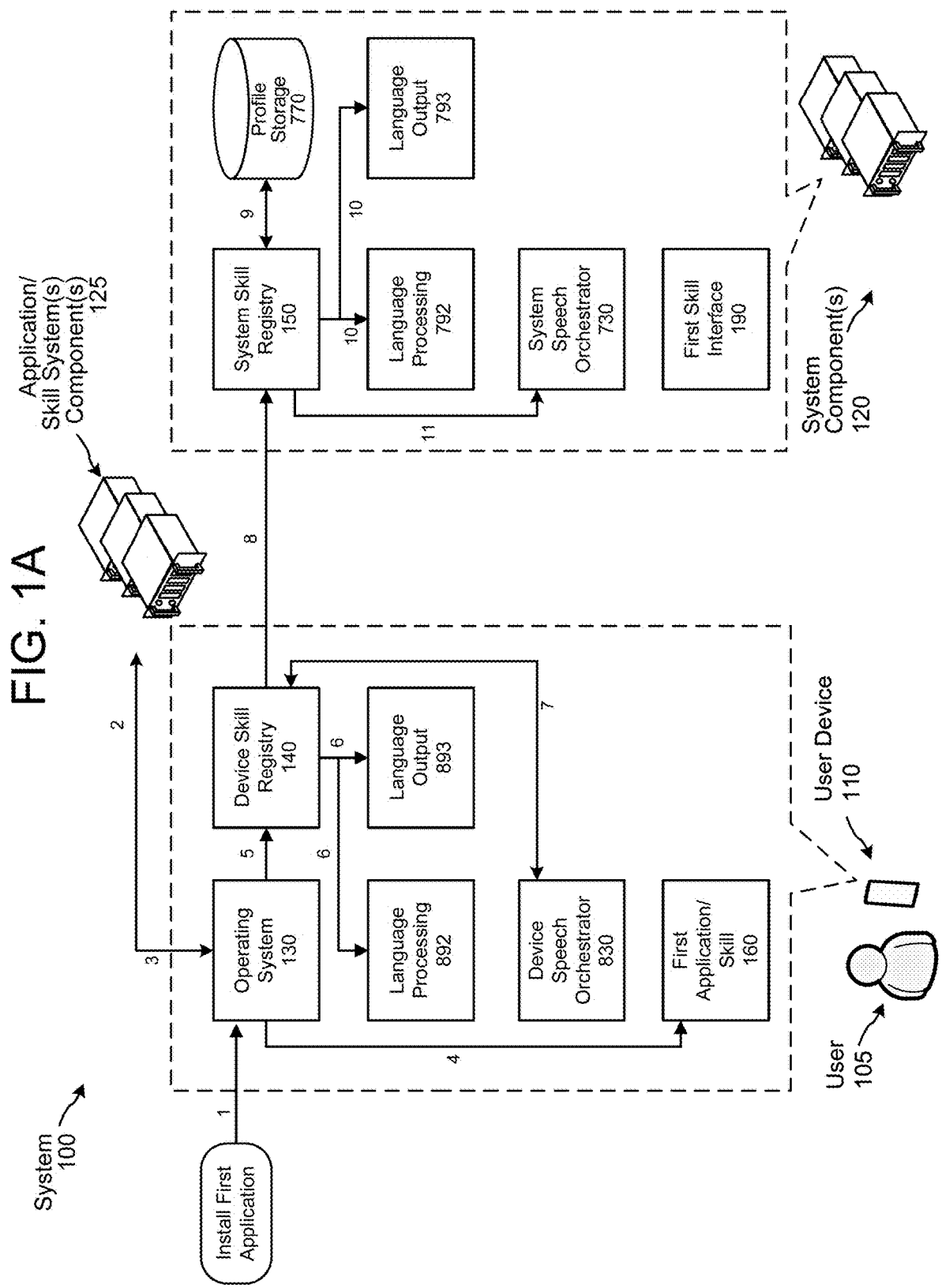
FIG. 1A illustrates a device registering an application as a speech-processing skill endpoint according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system, sometimes referred to as a spoken language understanding (SLU) system. Natural Language Generation (NLG) includes enabling computers to generate output text or other data in words a human can understand, such as sentences or phrases. Text-to-speech (TTS) is a field of computer science concerning transforming textual and/or other data into audio data that is synthesized to resemble human speech. ASR, NLU, NLG, and TTS may be used together as part of a speech-processing/virtual assistant system.

The system may be configured to incorporate user permissions and may only perform activities disclosed herein if approved by a user. As such, the systems, devices, components, and techniques described herein can be configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

A system may cause a skill to perform actions in response to natural language inputs (e.g., spoken inputs and/or typed inputs in a language spoken by humans). For example, for the natural language input "play classical music," a music skill may be invoked to output music of a category corresponding to "classical." For further example, for the natural language input "turn on the lights," a smart home skill may be invoked to turn on "smart" lights associated with a user's profile. In another example, for the natural language input "what is the weather," a weather skill may be invoked to output weather information for a geographic location corresponding to the device that captured the natural language input. In the foregoing examples, actions correspond to the outputting of music, turning on "smart" lights, and outputting of weather information in a synthetic voice using TTS. As used herein, an "action" may refer to some result of a skill's processing. In a natural language processing (NLP) system such as Amazon's Alexa, some language processing is performed using a remote system having expandable language processing capability (e.g., capable of processing a large number of requests simultaneously), while other language processing may be performed by individual device(s) having limited processing capability (e.g., resource constrained devices capable of processing a small number of requests simultaneously).

As speech processing can use a significant amount of computing resources, certain speech processing systems may utilize a distributed computing environment where one device captures a spoken utterance, determines audio data representing the utterance, and sends the audio data to another device that performs at least some of the speech processing functionality. In such instances, the device that captures the audio is sometimes referred to herein as being "local" to a user, for example in the same room or otherwise within "earshot" so that the user's voice can be captured by the device's microphone(s), while some of the processing component(s) may be in a different location, for example in a location that is "remote" from the user's location, such as in a different room or a different building (e.g., data center, sometimes referred to as the "cloud" in which networked communications are used to communicate data with the local device). In certain circumstances, a local device may have sufficient computing capabilities to perform more involved speech processing operations such as all or some of ASR, NLU, NLG, TTS, and/or aspects of speech processing/ command execution. When a local device has such capabilities it may handle speech processing on its own, and/or may coordinate with certain remote system component(s) depending on individual operating conditions/processing requirements.

Certain devices, however, may be capable of performing at least a portion of (if not all) speech processing functionality. Such devices may coordinate with distributed system component(s) to handle a speech request with distributing components combining to perform speech processing, and create and output responsive data. In certain embodiments, a various components of a system (e.g., local and remote components) may perform speech processing in parallel, with the system selecting the output data determined by one of them for purposes of outputting to a user.

In a system where speech processing is at least partially handled remotely, a user may activate/deactivate specialized skills which enable the system to perform additional functionality (e.g., smart home control, media playback, specialized trivia, games, or the like). To enable a skill a user may interact with a companion device and/or application (such as the Amazon Alexa software application) to select which skills are to be enabled for speech processing purposes and/or the system can enable skills automatically (e.g., based on the system determining a skill being best to service a user input). Such skills can be operated by a distributed computing environment, however, which allows for the centralized control by the companion application or other system component(s).

When a device can download and install its own applications, however, coordinating the interactions between those applications and speech processing components becomes more challenging. Such a device may include, for example, a smart phone, smart watch, tablet, smart speaker, television, automobile, airplane, bus, personal computer, appliance, etc. capable of installing applications to run on-device. For example, an automobile with an infotainment system that can be customized through application installation. In another example such a device may include a gaming console with downloadable games or other applications. In another example such a device may include a speech-controllable device, such as one with a display like an Echo Show or the like. Offered is a system and method that can determine when speech-enabled applications are installed/activated for a particular device. Specifically, the system can determine when those applications can act as skill endpoints, such that those applications can process data output from a speech processing system/use such data to determine a response to a spoken user input. The system may also configure speech processing components to be customized to such speech-enabled applications, such as adjusting on-device and/or system components to operate in a customized manner based on one or more on-device applications that are installed/enabled with regard to the specific device.

Figure 1C:
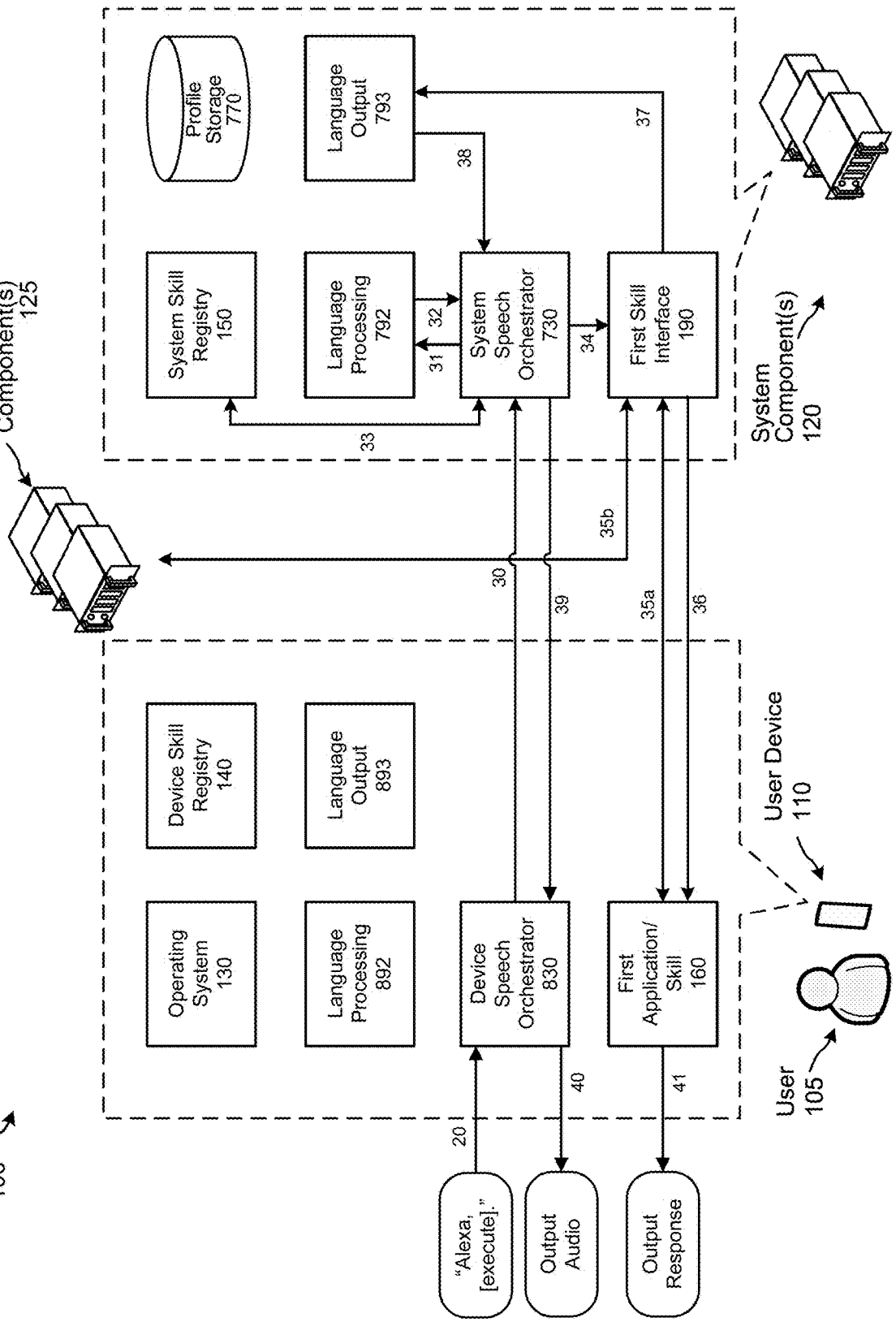

FIGS. 1A-1C are conceptual diagrams illustrating a virtual assistant system 100 for performing speech/natural language processing, according to embodiments of the present disclosure. As shown in FIGS. 1A-1C, the system 100 may include one or more user devices 110 local to a user that may optionally communicate with various system component(s) 120 (sometimes referred to as "system 120") and/or skill support component(s) 125 via one or more network(s) (not shown). Although the figures and discussion of the present disclosure illustrate certain steps in a particular order, the steps described may be performed in a different order (as well as certain steps removed or added) without departing from the present disclosure.

A device 110 may receive audio corresponding to a spoken natural language input originating from the user 5. The device 110 may process audio following detection of a wakeword or other wake command such as a button press, gesture detection, etc. The device 110 may generate audio data corresponding to the audio, and may send the audio data 111 for further speech processing. For example, the device 110 may send the audio data to the system 120 via an application that is installed on the device 110 and associated with the system 120. An example of such an application is the Amazon Alexa application that may be installed on a smart phone, tablet, or the like. In some implementations, the device 110 may receive text data 713 corresponding to a natural language input originating from the user 5, and send the text data to the system 120. The device 110 may also receive output data from the system 120, and generate a synthesized speech output. The device 110 may include a camera for capturing image and/or video data for processing by the system 120. Examples of various devices 110 are further illustrated in FIG. 15. The system 120 may be a remote system such as a group of computing components located geographically remote from device 110 but accessible via network 199 (for example, servers accessible via the internet). The system 120 may also include a remote system that is physically separate from device 110 but located geographically close to device 110 and accessible via network 199 (for example a home server located in a same residence as device 110). System 120 may also include some combination thereof, for example where certain components/operations are performed via a home server(s) and others are performed via a geographically remote server(s).

The device 110 may include a device with a variety of components such as one or more microphone(s), loudspeaker(s), display(s), camera(s), or the like such as components discussed below in reference to FIG. 13. The device 110 may be configured with an operating system (OS) 130 which may control operation of the device. The operating system 130 may be configured to manage hardware resource devices such as the network interface(s), the I/O devices of the respective devices, and so forth, and provide various services to applications or components executing on the processors. Such an OS 130 may implement a variant of the FreeBSD operating system; other UNIX or UNIX-like variants; Android operating system promulgated by Google; another variation of the Linux operating system; the FireOS operating system from Amazon.com Inc.; the Windows operating system from Microsoft Corporation; LynxOS as promulgated by Lynx Software; Operating System Embedded (Enea OSE) as promulgated by ENEA AB of Sweden; iOS as promulgated by Apple; and/or so forth.

Operation of the device using the OS 130 may involve a number of user interfaces including an audio/voice user interface, graphical user interface (GUI), etc. depending on the device configuration. The device 110 may allow a user 105 to customize operation of the device 110 using many different device preferences/settings as well as installing (and/or removing) different software applications. Certain such applications may be capable of performing operations in response to speech commands, even if the majority of the actual speech processing is performed by components other than the specific application, such as one or more component(s) associated with the device 110, and/or system component(s) 120. Thus, a particular device application may be configured to process output data from a speech processing system, such as NLU results data (such as NLU output data 1185 and/or 1125 discussed below). A particular application may be configured to perform processing with regards to certain intents but not others. For example, a music application may be configured to perform operations/respond to related to music playback, selection, etc. while a game application may be configured to perform operations/respond to intents related to game interactions or the like. Put another way, a device application may function similarly to a skill component, where a skill may comprise software that can process NLU results data (or similar data) to execute actions that are responsive to a spoken input.

In order for a device application to perform processing of speech processing output data, the speech processing component(s) must have information that the corresponding output data (for example, invoking an intent that can be processed by the particular application) should be routed to the particular device application. To do this, the present system may incorporate a device registry that tracks which applications are installed on a device that are capable of acting as skill endpoints, that is applications that are capable of processing speech processing output data or otherwise performing operations in response to spoken commands.

FIG. 1A illustrates a device 110 registering an application as speech-processing skill endpoint according to embodiments of the present disclosure As shown in FIG. 1A step 1, a user may input to device 110 a command to install a first application. This command may be input into the device as part of interaction with a GUI or similar interface. For example, a user may be operating a different application corresponding to an application downloader (e.g., an application store or the like) and may select a particular application (e.g., first application 160) for installation on device 110. In other configurations other actions may result in activation of the application to be implemented on the user device. For example, a predictive component may determine that the application is to be installed on/activated for the device 110. In other examples, the application may be installed on another device associated with a same user profile, which may also, depending on user preference, result in installation/activation of the application on the device 110. Various other techniques of installing/activating the application on the device 110 are also possible. The command (or other indication that the application is to be installed/activated for the device 110) may be captured by an operating system 130 and/or other application which may then send a request (step 2) to a device/component from which the particular application may be downloaded. Such a component may be application/skill system component(s) 125 or some other component. The device may receive (step 3) the software corresponding to the application and may coordinate installing (step 4) the first application 160, for example using the OS 130 or other components of the device 110. After installation, the first application may be capable of operation as normal during operation of the user device 110.

The device 110 (for example using OS 130 and/or some other component) whether the first application 160 is capable of acting as a speech processing skill, that is whether the application is capable of processing speech processing output data. To make this determination the system 100 may analyze certain data related to the application. For example, the device 110 (or other system component) may process metadata corresponding to the application (e.g., from application/skill system component(s) 125) to determine that the first application 160 is capable of processing speech processing output data. The setting data for the first application 160 (which may be accessible to OS 130) may indicate such capability. Alternatively, or in addition, the device 110 may present to the user preference/setting choices in which the user 105 may indicate that the first application 160 is to be configured to process speech processing output data. Such user indication may specify what operations/intents the first application 160 is to handle. One application 160 may be configured to operate with regard to a single intent or with regard to multiple intents.

The OS 130 may coordinate with the device skill registry 140 (step 5) to store data indicating that the first application 160 is configured to process speech processing output data. Such stored data 202 may indicate what types of speech processing results data, e.g., operations/intents, or the like the first application 160 is to handle. For example, FIG. 2 illustrates data 202 stored by a device skill registry 140 according to embodiments of the present disclosure. As shown, the device application data 202 may indicate which application(s) have been installed on the device 110 as well as what intents (as represented in NLU results data) may be processed by the particular application. The device application data 202 may also indicate what specialized speech data may be used by speech components for purposes of speech processing with regard to the particular application. For example, device application data 202 shown in FIG. 2 illustrates that a first application, Game1 is associated with a specific wakeword ("Game1-ww") as well as with special ASR model data which may be incorporated by ASR component(s) of the device 110/system component(s) 120 as described below. Also in an example shown in FIG. 2, a second application Game2 is associated with custom entity resolution (ER) model data. Such model data may be incorporated by NLU component(s) of the device 110/system component(s) 120 as described below. Also as an example shown in FIG. 2, a third application CameraWizard is associated with custom TTS model data. Such TTS model data may be incorporated by TTS component(s) of the device 110/system component(s) 120 as described below, for example to produce synthesized speech using a custom voice associated with the Camera Wizard application. The custom speech data may be associated with respective identifiers (e.g., X65 for the ASR model data for Game1, 2r4 for the ER model data for Game2, 5YU3 for CameraWizard, etc.). Such identifiers may be used by the device 110/system component(s) 120 to identify the specific speech data to be incorporated for operation with regard to that specific application.

Although not illustrated in FIG. 2, such stored data may also indicate what user(s) are permitted to interact with the first application 160 for handling a spoken command. For example, device 110 may be associated with multiple user profile(s) (for example, as described below in reference to profile storage 770). The device 110 may be configured so that spoken commands may only invoke first application 160 (and/or selected operations thereof) if one or more approved user(s) are interacting with device 110. (To determine if a user operating the device 110 is approved, the device 110 and/or system 100 may use user recognition components 795/895 as discussed herein.)

The OS 130, device skill registry 140, and/or other component of device 110/server 120 may determine whether speech processing that invokes or involves the first application 160 may involve any customized components or other data that may be used for speech processing. For example, speech commands intended for the first application 160 may be associated with a customized wakeword. The specialized wakeword may require reconfiguring of a wakeword detector (e.g., wakeword detection component 720 discussed below). In another example, speech commands intended for the first application 160 may involve special words (e.g., "umptyfratz") that may not be recognized by a regular ASR component. In another example, speech commands intended for the first application 160 may involve one or more customized intent(s) that a device/system NLU component may not be configured to indicate. In another example, a response to a speech command intended for the first application 160 may use specialized words or favor certain words over others, in a way that a device/system NLG component may not be configured to select. In another example, a TTS response to a speech command intended for the first application 160 may call for a customized voice (for example, representing an avatar associated with first application 160) for synthesized speech created by the TTS component. Thus, as part of, or following, installation of the first application the device 110 may perform operations (step 6) to update speech components of the device 110 to customize the component(s) as necessary to allow speech processing configured for the first application 160.

In one example, the device skill registry 140 may pass ASR and/or NLU model data corresponding to the first application 160 to a language processing component 892 (discussed further below). For example, the first application 160 may be associated with data to be used to supplement/update/reconfigure an ASR component 850 for operation with regard to the first application 160. Such data may comprises data corresponding to an acoustic model 953, a language model 954, an FST 955, or other ASR model 950 (such models are discussed in more detail below). Such data may be sent from the device skill registry 140 (or other component) to an ASR component 850 (e.g., within a language processing component 892) as shown in step 6. Such data may be used to allow the ASR component 850 to recognize words associated with the first application 160 when included in an utterance.

The first application 160 may also be associated with data to be used to supplement/update/reconfigure an NLU component 860 for operation with regard to the first application 160. Such data may comprises data corresponding to a named entity recognizer (NER) 1062, an intent classification component 1064, an entity resolution component 1170, a reranker 1190, a post-NLU ranker 765, or other NLU model/component (such models are discussed in more detail below). Such data may be sent from the device skill registry 140 (or other component) to an NLU component 860/post-NLU ranker 765 (e.g., within a language processing component 892) as shown in step 6. Such data may be used to allow the NLU component 860/post-NLU ranker 765 to recognize perform natural language understanding in interpreting an utterance associated with the first application 160.

The first application 160 may also be associated with data to be used to supplement/update/reconfigure an NLG component 879 (as discussed below) for operation with regard to the first application 160. Such data may comprises model data that allows the NLG component 879 to generate natural language as part of an interaction involving the first application 160. Such data may be sent from the device skill registry 140 (or other component) to an NLG component 879 (e.g., within a language output component 893) as shown in step 6.

The first application 160 may also be associated with data to be used to supplement/update/reconfigure an NLG component 879 (as discussed below) for operation with regard to the first application 160. Such data may comprises model data that allows the NLG component 879 to generate natural language as part of an interaction involving the first application 160. Such data may be sent from the device skill registry 140 (or other component) to an NLG component 879 (e.g., within a language output component 893) as shown in step 6.

The first application 160 may also be associated with data to be used to supplement/update/reconfigure a TTS component 880 (as discussed below) for operation with regard to the first application 160. Such data may comprises model data that allows the TTS component 880 to synthesized speech as part of an interaction involving the first application 160, for example in a particular voice and/or with specific voice characteristics associated with the first application 160. Such data may include, for example, data corresponding to a specific TTS model 1260. Such data may be sent from the device skill registry 140 (or other component) to a TTS component 880 (e.g., within a language output component 893) as shown in step 6.

The first application 160 may also be associated with data to be used to supplement/update/reconfigure a wakeword component 720 (as discussed below) for operation with regard to the first application 160. For example, the first application 160 may be associated with a particular wakeword. Such data may be sent to a wakeword component 720 to configure its operation to allow for the operation with regard to first application 160.

The device skill registry 140 (or other component) may also update a device speech orchestrator (DSO) 830 (discussed below). The DSO may coordinate processing of speech requests for the device 110 and thus may update certain settings/configurations to properly handle speech processing that may involve the first application 160, for example known which NLU results data should be routed to the first application 160 for processing.

The above model data/updated configurations, etc. may be obtained from application/skill system(s) component(s) 125, from within the first application 160 itself, or from some other source for purposes of routing and updating as discussed above. Once the respective component(s) receives the respective model/update data corresponding to the first application 160 (as shown in steps 6 and 7), the device 110 may perform operations to incorporate the model data so that the respective component(s) and/or the device 110 are configured to operate the first application as part of the speech processing operations of the device 110, including acting as a skill endpoint. This may include adjusting settings, performing individual updating, etc. to adjust operation of the respective components depending on their configurations.

Figure 8:
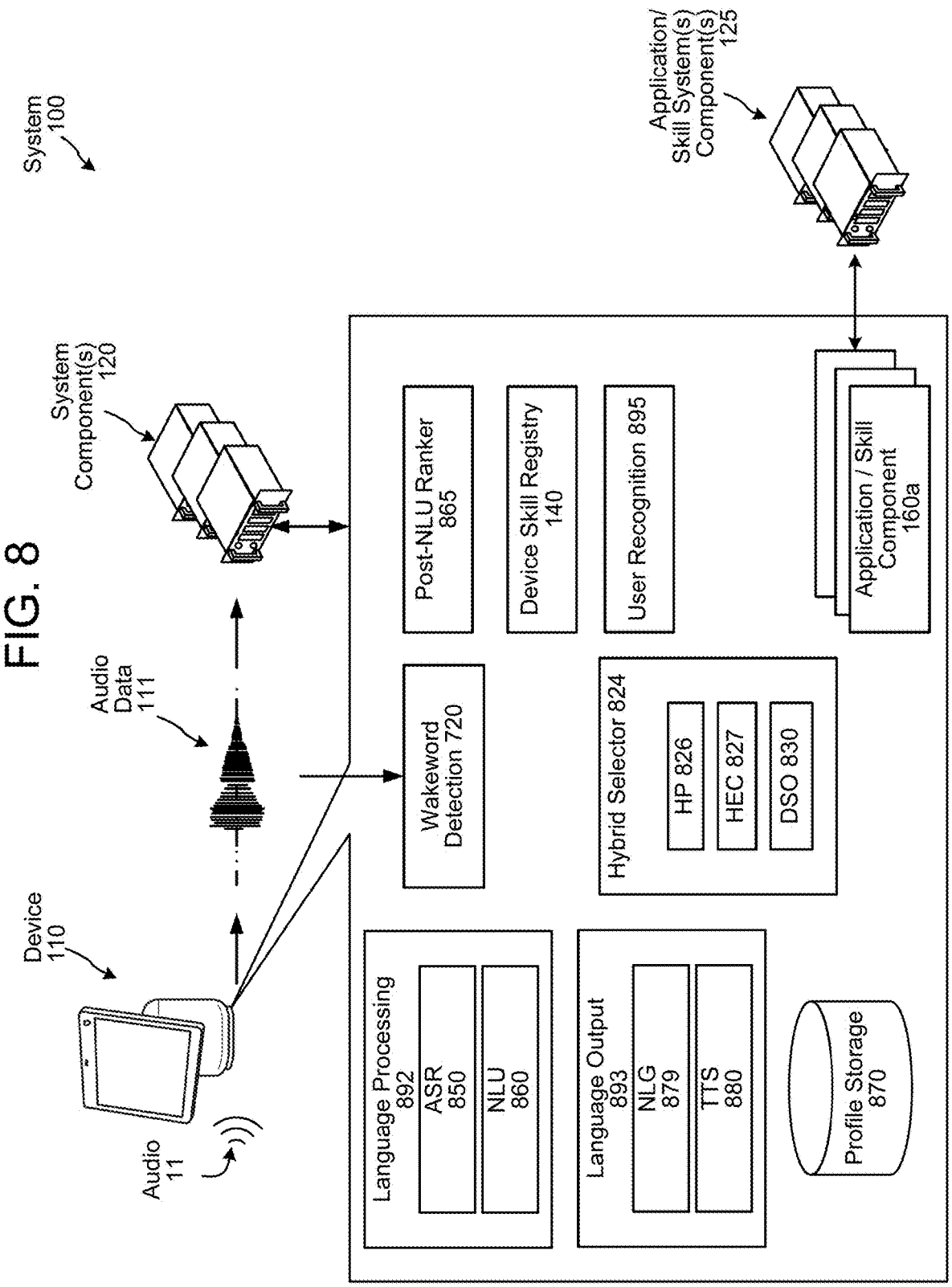
FIG. 8 is a conceptual diagram illustrating components that may be included in a device, according to embodiments of the present disclosure.

As the device 110 may operate with the system component(s) 120 to provide a speech processing system that provides a comprehensive user experience (which in some instances may involve both 110 and 120 performing speech processing for the same utterance as discussed below in reference to FIG. 8 and hybrid mode operations), it is desirable for the system component(s) 120 to also have information about what applications are installed/enabled with respect to the device 110. To ensure this information is provided to the system component(s) 120, the device skill registry 140 may send (as shown in step 8) information to the system component(s) 120, for example, to a system skill registry 150, that the first application 160 has been installed/activated for device 110. The system skill registry 150 may similarly notify (as shown in step 9) profile storage 770 (discussed below) that the first application 160 has been installed/activated for device 110. (In some configurations system skill registry 150 may be incorporated within the profile storage 770.)

Figure 3:
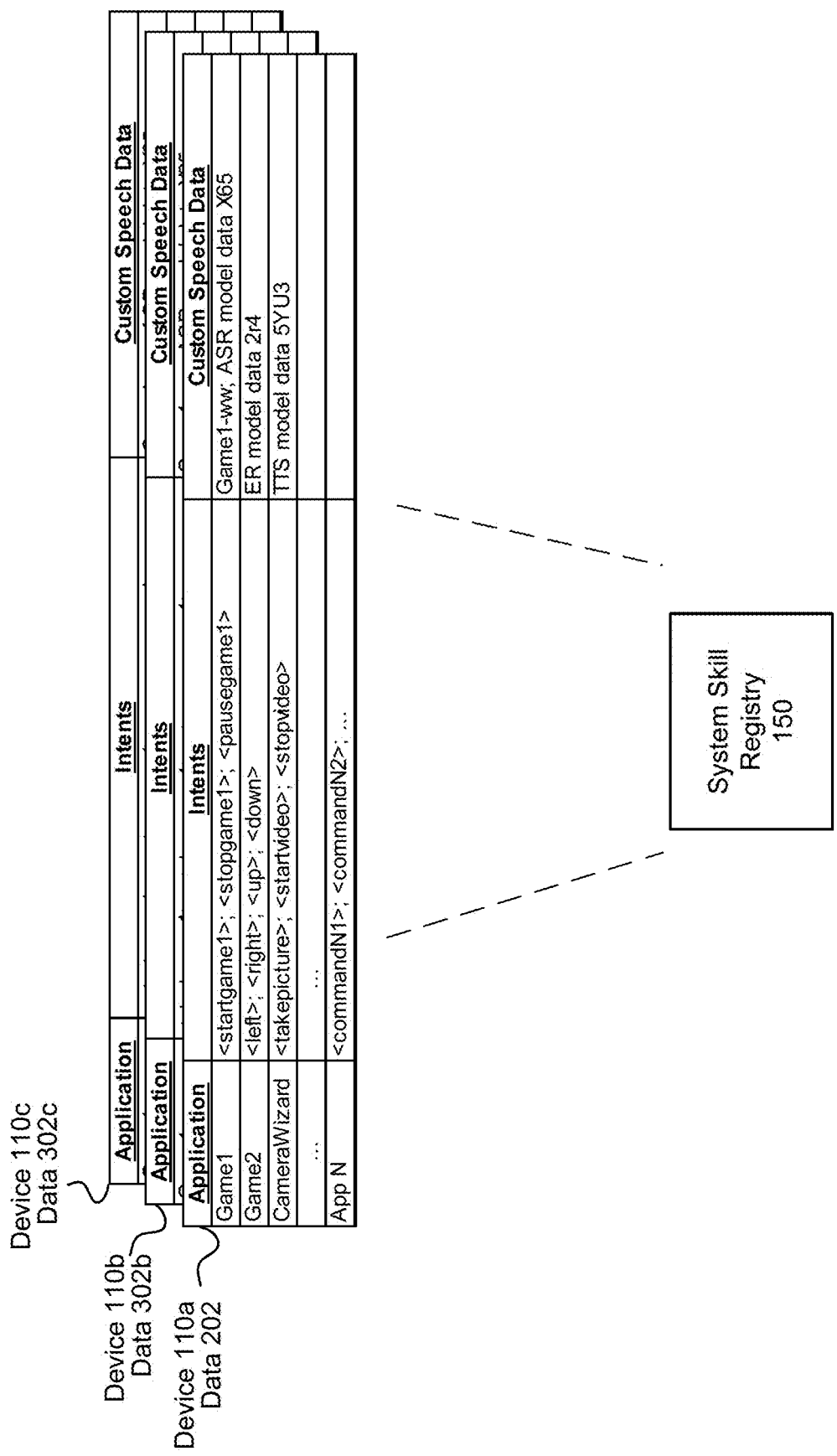
FIG. 3 illustrates data stored by a system skill registry according to embodiments of the present disclosure.

The system skill registry 150 may track what applications have been configured for what devices 110 for purposes of speech processing/skill endpointing. When a new application is installed for the device 110, the system skill registry 150 may receive its respective data and may update its storage for the device 110 accordingly. FIG. 3 illustrates data stored by a system skill registry according to embodiments of the present disclosure. As shown, the data stored by the system skill registry 150 may include application data 202 for a first device 110*a*, application data 302*b* for a second device 110*b*, application data 302*c* for a third device 110*c*, and so forth. The system skill registry 150 may store data associating the particular device 110 (for example, using a device ID, profile ID, etc.), the installed application (e.g., an application ID for first application 160) and potentially other information, such as what types of speech processing results data (e.g., which intents/NLU results data) may be handled by the particular application (e.g., first application 160) so that if such NLU results data is determined, it may be properly routed by the system component(s) 120 to the first application 160 and/or first skill interface 190. The first skill interface 190 may correspond to software/other functionality operating with respect to system component(s) 120, but relating to potential operation of the first application 160.

After the system component(s) 120 receives information that the first application 160 has been installed for the device 110 the system component(s) 120 may take steps to update (as shown in steps 10 and 11) internal components (e.g., language processing 792, language output 793, system speech orchestrator 730, all discussed in further detail below) so that such components may be configured to properly handle an incoming utterance involving first application 160 if any customized processing may be called for. Such updating may be similar to that described above for the speech components of the device 110 (e.g., as referenced with regard to steps 6 and 7).

In this manner, as described in FIG. 1A, the system 100 may be configured to install/activate a first application 160 on device 110 and to configure speech processing components both on device 110 and on system component(s) 120 to operate with regard to first application 160.

If the device 110 were to receive a command to uninstall and/or deactivate the first application 160, the system 100 may perform operations to further update the system accordingly. For example, the device skill registry 140 may change data to indicate the first application 160 has been uninstalled/deactivated with respect to device 110 and may similarly inform system skill registry 150. The device 110 may then take operations to adjust its speech processing components accordingly (e.g., language processing 892, language output 893, DSO 830, wakeword component 720, etc.), for example to disable extensions or other data that configured operations (such as those described above) to allow device 110 to perform speech processing with regard to first application 160. The system component(s) 120, in response to receiving indication from device 110 (for example as a result of a communication from device skill registry 140 to system skill registry 150) that the first application 160 has been uninstalled/deactivated with respect to device 110 may also take operations to adjust its speech processing components accordingly (e.g., language processing 792, language output 793, orchestrator 730, wakeword component 720, etc.), for example to disable extensions or other data that configured operations (such as those described above) to allow system component(s) 120 to perform speech processing with regard to first application 160 and device 110. The system 100 may also perform actions related to first application 160 being uninstalled/deactivated under circumstances should the first application 160 become uninstalled/deactivated even absent an express user input. For example, if the first application 160 is no longer able to operate with respect to device 110 (for example, due to a software change/error in OS 130, first application 160, or the like, or if certain operating parameters change rendering first application 160 unable to operate on device 110) and this is determined by device 110, the device 110 may update the device skill registry 140 accordingly to indicate the change and the device 110 and/or system component(s) 120 may perform operations to disable/remove the functionality associated with speech processing with respect to first application 160.

The device 110 may also allow specific settings to control different intents/speech processing results of the first application 160. This may allow a user 105 to execute more finer control over the first application 160 beyond simple enabling or disabling. For example, while a first application 160 may be capable of operating with regard to a first intent and a second intent, a user may indicate that the first application 160 should only perform processing with regard to the first intent and not the second intent. In such a situation the device 110 may update the device skill registry 140 to indicate that the first application 160 should only perform processing with regard to the first intent and not the second intent. The device 110 may also send a corresponding indication to the system component(s) 120 so that the system may update the system skill registry 150 in a similar manner. The system 100 may also update any language processing components 892, language output components 893, or other components accordingly.

Returning to the situation where the first application 160 is installed/activated, FIGS. 1B and 1C illustrate operations of the system 100 configured to perform speech processing using on-device application(s) acting as a speech-processing skill endpoint according to embodiments of the present disclosure. As shown in FIG. 1B at step 20, the device 110 may receive a speech input intended to invoke first application 160. The precise makeup of the particular utterance may depend on the first application 160, the intended command to be performed, etc. The device 110 detects audio, determines the audio is intended for processing by the system 100 (for example, through detection of a wakeword as described below), converts the audio of the utterance into audio data (for example using microphone(s) 1320 discussed below) and sends the audio data (as shown in step 20) to the DSO 830. The DSO 830 may receive the audio data and other metadata (e.g., identity of the wakeword, etc.) and may send the audio data (as shown in step 21) to the on-device language processing component(s) 892 for processing. For example, the ASR component 850 may process the audio data to determine ASR data 910 which may then be sent to the NLU component 860 to determine NLU results data, e.g., NLU output data 1185/1125. As described below in reference to FIGS. 10/11, the NLU results data may include data representing an NLU interpretation/hypothesis. Such data may include an intent indicator, indication of a recognized entity, indication of a resolved entity, etc. As noted above, the ASR/NLU processing may be performed by ASR component 850/NLU component 860 as they may have been updated/customized to operate in a specific manner to account for first application 160 being installed on device 110.

The NLU results data may then be sent (as shown in step 22) to the DSO 830. The DSO 830 may query (as shown in step 23) the device skill registry 140 to determine if the NLU results data corresponds to one or more applications operating on the device 110. (Note the device 110 may also query the device skill registry 140 at other times to determine if the active application(s) 160 that may be capable of processing with regard to speech processing results.) Alternatively, or in addition, the DSO 830 may already be configured to determine that information without querying the device skill registry 140. The DSO 830 may evaluate the NLU results data to determine that the speech corresponds to an action to be performed by the first application 160. For example, an intent indicator of the NLU results data may match an operation to be performed by the first application 160. Thus, the DSO 830 determines that the first application 160 should be the recipient/endpoint for the NLU results data for purposes of responding to the utterance.

If the NLU results data does not match an application as represented in the device skill registry 140, the device 110 may send the NLU results data to the system component(s) 120 for routing to a skill 790 of the system component(s) 120.

To determine that the NLU results data corresponds to the first application 160 the DSO 830 may also evaluate context data corresponding to operation of the device 110. For example, the DSO 830 may determine that the first application 160 is open and active with regard to the device 110 (for example, displaying in the foreground of a GUI or the like), and that a user is interacting with the first application 160, for example through the GUI. This may assist with the DSO 830 with routing the NLU results data to the first application 160. For example, multiple on-device applications may be capable of handling a request to "stop", however the DSO 830 may determine from operational data (for example, made available to the DSO 830 through the OS 130) indicating that the first application 160 is currently active and being interacted with, that a "stop" utterance should be processed by first application 160.

Other contextual data that may be evaluated by the DSO 830 may include which applications are running but inactive (for example, in the background of the device 110), which applications are installed but not running, the status of the various applications (e.g., which ones may have an active, but background process such as a timer), or the like. The DSO 830 may also process information such as time of application installation, time of last use of an application, etc. The DSO 830 may send such information as appropriate to the language processing component 892 for appropriate interpretation, for example to interpret/process an utterance such as "tell the new application to start part 1" the language processing component 892/DSO 830 may use information indicating which application was most recently installed/activated.

Once the DSO 830 has indicated the appropriate destination application, the DSO 830 may then send (as shown in step 24) the NLU results data and any associated metadata (e.g., session ID, user ID, etc.) to the first application 160. The first application 160 may then take further operations using the NLU results data to determine next steps that should occur to process with regard to the speech. In doing so the first application 160 may communicate with a corresponding application/skill system component(s) 125 which may be, for example, back-end/cloud systems that are configured to perform operations with regard to the first application 160. The first application 160 may also perform any internal operations called for in order to process with regard to the intent/NLU results data. If a response to the utterance calls for a synthesized speech output, the first application 160 may send data (as shown in step 26) to the language output component 893 to determine a synthesized speech response to the utterance. This may involve operations by the NLG component 879 and/or TTS component 880, both of which may be configured to operate with regard to the first application 160 as indicated above with regard to FIG. 1A. For example, audio data output by the language output component 893 may represent synthesized speech using words and/or a voice customized for first application 160. The output audio from language output component 893 may be sent to DSO 830 (as shown in step 27) for output by the device 110 (e.g., using speaker 1312) as shown in step 28.

The first application 160 may also determine its own output response, as shown in step 29. Such an output may include an output using the GUI of the device (e.g., presenting content on display 1316) and/or some other output for example, taking a picture with camera 1318, changing a setting of device 110 (such as a volume setting), playing other audio using the speaker 1312, etc. depending on the first application 160 and the spoken command. The first application 160 may also send output data (not shown) to another component(s) for execution depending on the user's command. For example, the first application 160 may cause output data to be sent to another device such as an appliance, vehicle, or the like. The first application 160 may also send output data back to the application skill system component(s) 125 and/or the system component(s) 120 so the respective system component(s) 120/125 can perform further operations with regard to that output data, for example, updating state information relative to the device, obtaining further information, etc.

The system component(s) 120 may also process speech input to the device 110 based on information regarding local application(s) installed on the device 110. As shown in FIG. 1B at step 20, the device 110 may receive a speech input intended to invoke first application 160. The device 110 detects audio, determines the audio is intended for processing by the system 100 (for example, through detection of a wakeword as described below), converts the audio of the utterance into audio data (for example using microphone(s) 1320 discussed below) and sends the audio data (as shown in step 20) to the DSO 830. The DSO 830 (or other component such as those discussed below in reference to the hybrid selector 824) may receive the audio data and other metadata (e.g., identity of the wakeword, etc.) and may send the audio data and/or any relevant metadata (as shown in step 30) to the system component(s) 120 for further processing. Such metadata may indicate the device 110 and/or relevant user profile associated with the incoming utterance so that the system component(s) may perform processing appropriate for audio data associated with the device 110/particular user profile (for example, processing that incorporates the first application 160 being installed by device 110). For example, the audio data may be sent to system speech orchestrator 730.

The system speech orchestrator 730 may then send the audio data and/or any relevant metadata (as shown in step 31) to the system language processing component(s) 792 for processing. For example, the ASR component 750 may process the audio data to determine ASR data 910 which may then be sent to the NLU component 760 to determine NLU results data, e.g., NLU output data 1185/1125. As described below in reference to FIGS. 10/11, the NLU results data may include data representing an NLU interpretation/hypothesis. Such data may include an intent indicator, indication of a recognized entity, indication of a resolved entity, etc. As noted above, the ASR/NLU processing may be performed by ASR component 750/NLU component 760 as they may have been updated/customized to operate in a specific manner to account for first application 160 being installed on device 110.

The NLU results data may then be sent (as shown in step 32) to the orchestrator 730. The orchestrator 730 may query (as shown in step 33) the system skill registry 150 to determine if the NLU results data corresponds to one or more applications operating on the device 110. Alternatively, or in addition, the orchestrator 730 may already be configured to determine that information without querying the system skill registry 150. The orchestrator 730 may evaluate the NLU results data to determine that the speech corresponds to an action to be performed with respect to the first application 160. For example, an intent indicator of the NLU results data may match an operation to be performed by the first application 160 and/or by a corresponding skill interface 190 which may be associated with the installed application 160. (In certain configurations the first skill interface 190 may be an example of skill component 790 discussed below.) Thus, the orchestrator 730 may determine that the first application 160 should be the recipient/endpoint for the NLU results data for purposes of responding to the utterance.

The orchestrator 730 may then send (as shown in step 34) the NLU results data and any associated metadata (e.g., session ID, user ID, etc.) to the first application 160, which may be sent through the first skill interface 190 resulting in an exchange (as shown in step 35) between the first skill interface 190 and the first application 160. In certain instances the first skill interface 190 may be configured to perform operations as if performed by the first application 160 operating on device 110. In other instances the first skill interface 190/the first application 160 may coordinate operations to determine how to process/respond to the NLU results data. The first skill interface 190 and/or first application 160 may then take further operations using the NLU results data to determine next steps that should occur to process with regard to the speech. The first skill interface 190 and/or first application 160 may communicate with a corresponding application/skill system component(s) 125 which may be, for example, back-end/cloud systems that are configured to perform operations with regard to the first application 160. Data corresponding to the NLU results data and/or resulting from the processing may be sent by the first skill interface 190 to the first application 160, whereupon the device 110 may continue processing and operating to complete outputting a response to the utterance, for example as shown above with regard to FIG. 1B. The first skill interface 190 may determine output data to be output using the device 110/first application 160. Such data may be sent (as shown in step 36) from the first skill interface 190 to the first application 160 for eventual output.

In another embodiment, further processing may be performed by system component(s) 120 to respond to the utterance. For example, if a response to the utterance calls for a synthesized speech output, the first skill interface 190 may send data (as shown in step 37) to the language output component 793 to determine a synthesized speech response to the utterance. This may involve operations by the NLG component 779 and/or TTS component 780, both of which may be configured to operate with regard to the first application 160 as indicated above with regard to FIG. 1A. For example, audio data output by the language output component 793 may represent synthesized speech using words and/or a voice customized for first application 160. The output audio from language output component 793 may be sent to orchestrator 730 (as shown in step 38) to be sent to the device 110 (for example, to the DSO 830 as shown in step 39) for output by the device 110 (e.g., using speaker 1312) as shown in step 40. The first application 160 may also output a response, as shown in step 41, for example using a GUI, or other component of the device as discussed above. The output by the first application 160 may be based on non-audio data received by the system component(s) 125, for example data received by first skill interface 190 as shown in step 36.

Figure 4:
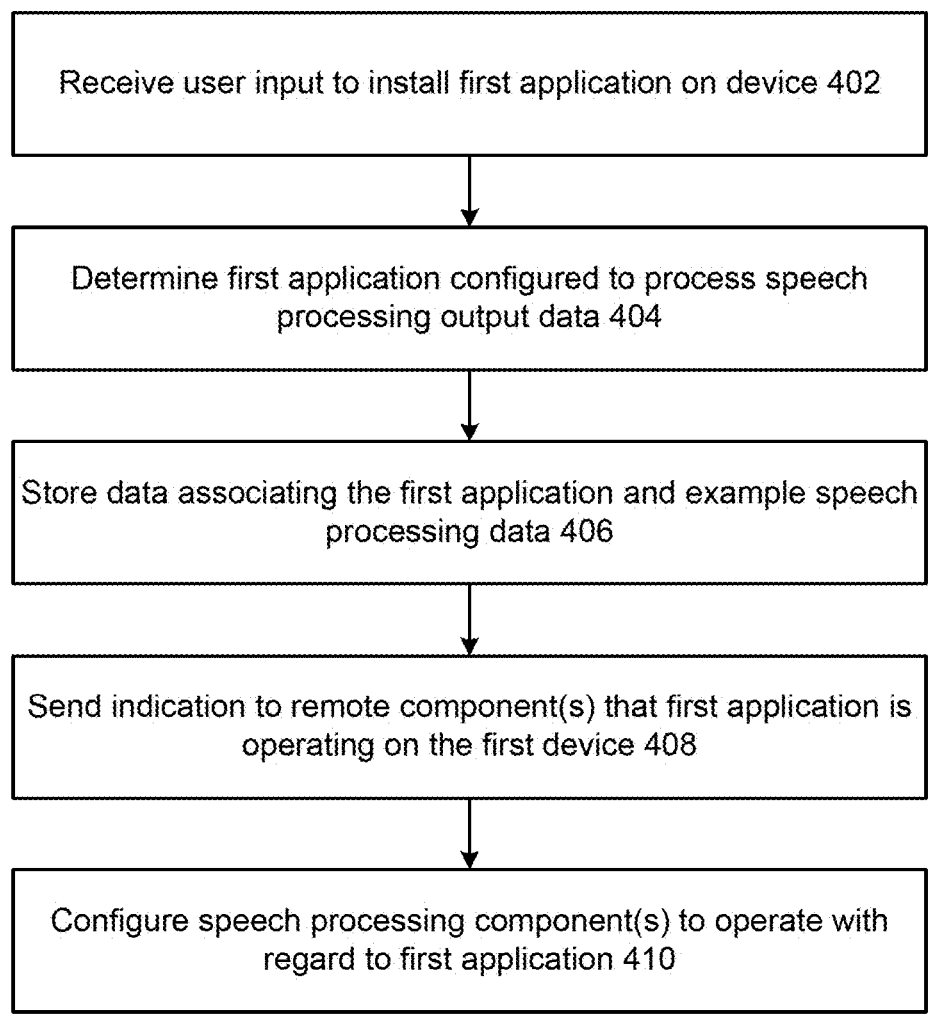
FIG. 4 illustrates operations by a device registering an application as a speech-processing skill endpoint according to embodiments of the present disclosure.

FIG. 4 illustrates operations by a device 110 registering an application as a speech-processing skill endpoint according to embodiments of the present disclosure, for example operations performed as illustrated in FIG. 1A. A device 110 may receive (402) a user input to install a first application 160 on the device 110. The device 110 may determine (404), for example using data associated with the first application 160 that the application is configured to process speech processing data, such as NLU output data 1185/1125, ASR data 910, or the like. The device 110 may store (406) data associating the first application and example speech processing data processable by the first application 160. The example speech processing data may include, for example, one or more intents that the application 160 is configured to process. Such data may be stored, for example, with a device skill registry 140. The device 110 may send (408) to a remote system (such as one or more system component(s) 120) an indication that the first application is operating on the device 110. The indication may also include metadata indicating the speech processing data (e.g., intent(s)) that the application 160 is configured to process. The device 110 may also configure (410) one or more speech processing component(s) to operate with regard to the first application 160, for example as described above in reference to steps 6 and 7 of FIG. 1A.

Figure 5:
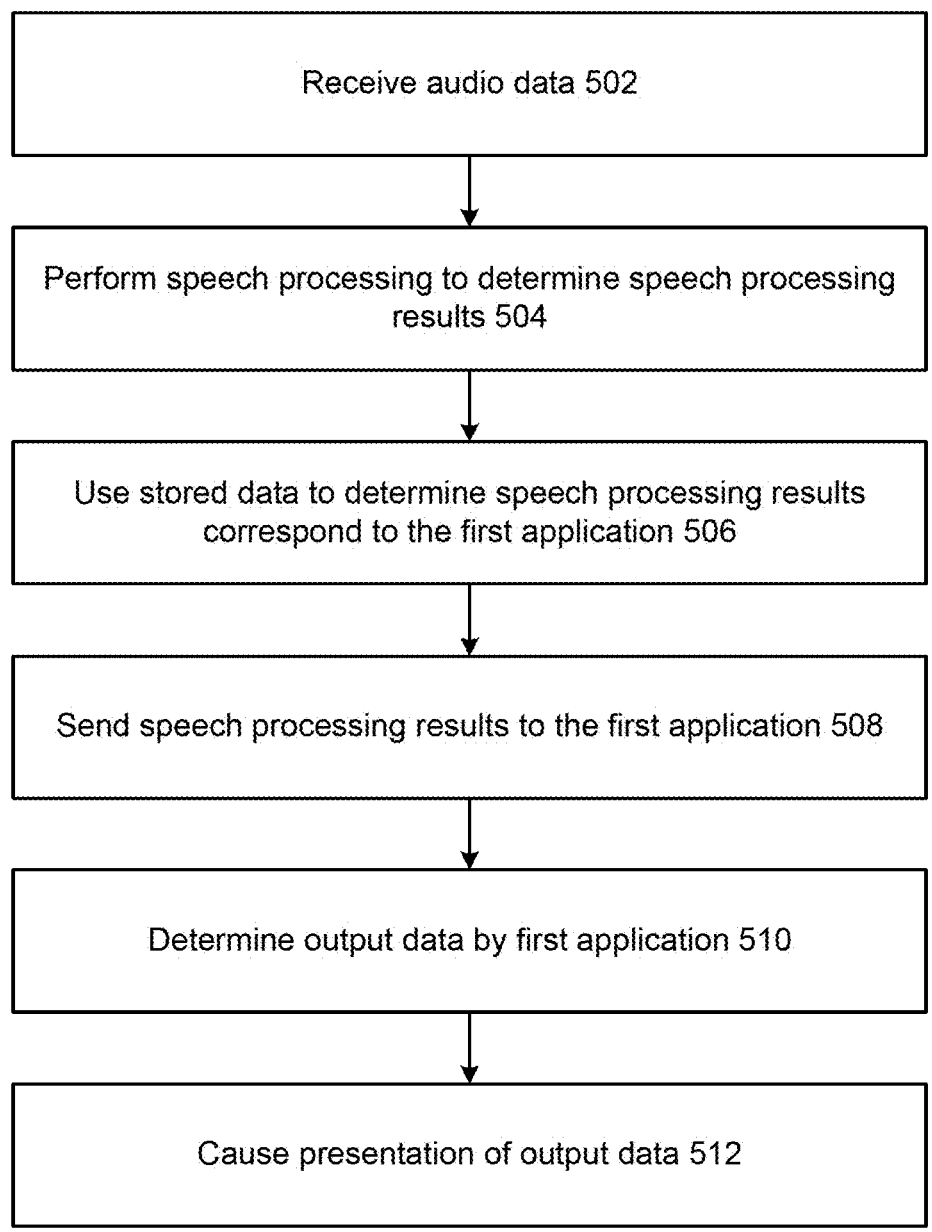
FIG. 5 illustrates operations by a device performing speech processing with an on-device application acting as a speech-processing skill endpoint according to embodiments of the present disclosure.

FIG. 5 illustrates operations by a device 110 performing speech processing with an on-device application acting as a speech-processing skill endpoint according to embodiments of the present disclosure, for example operations performed as illustrated in FIG. 1B. A device 110 may receive (502) audio data corresponding to an utterance captured by one or more microphone(s) 1320 of the device 110. The device 110 may perform (504) speech processing (e.g., ASR, NLU, etc.) on the audio data to determine speech processing results (e.g., NLU output data 1185/1125, ASR data 910, or the like). The speech processing may use component(s) that were configured to use data corresponding to the first application 160. The device 110 may use (506) stored data (for example, from device skill registry 140) to determine that the speech processing results correspond to the first application 160. For example, an intent of the speech processing results may be one that is processable by the first application 160. The device 110 may send (508) the speech processing results to the first application 160. The first application 160 may then determine (510) output data responsive to the speech processing results (and thus responsive to the utterance). The device 110 may then cause (512) presentation of the output data, for example by performing language output operations on the output data (e.g., using language output component 893) to determine output audio data for presentation, by determining image data to show using a GUI on a display 1316 of the device 110, or the like.

Figure 6:
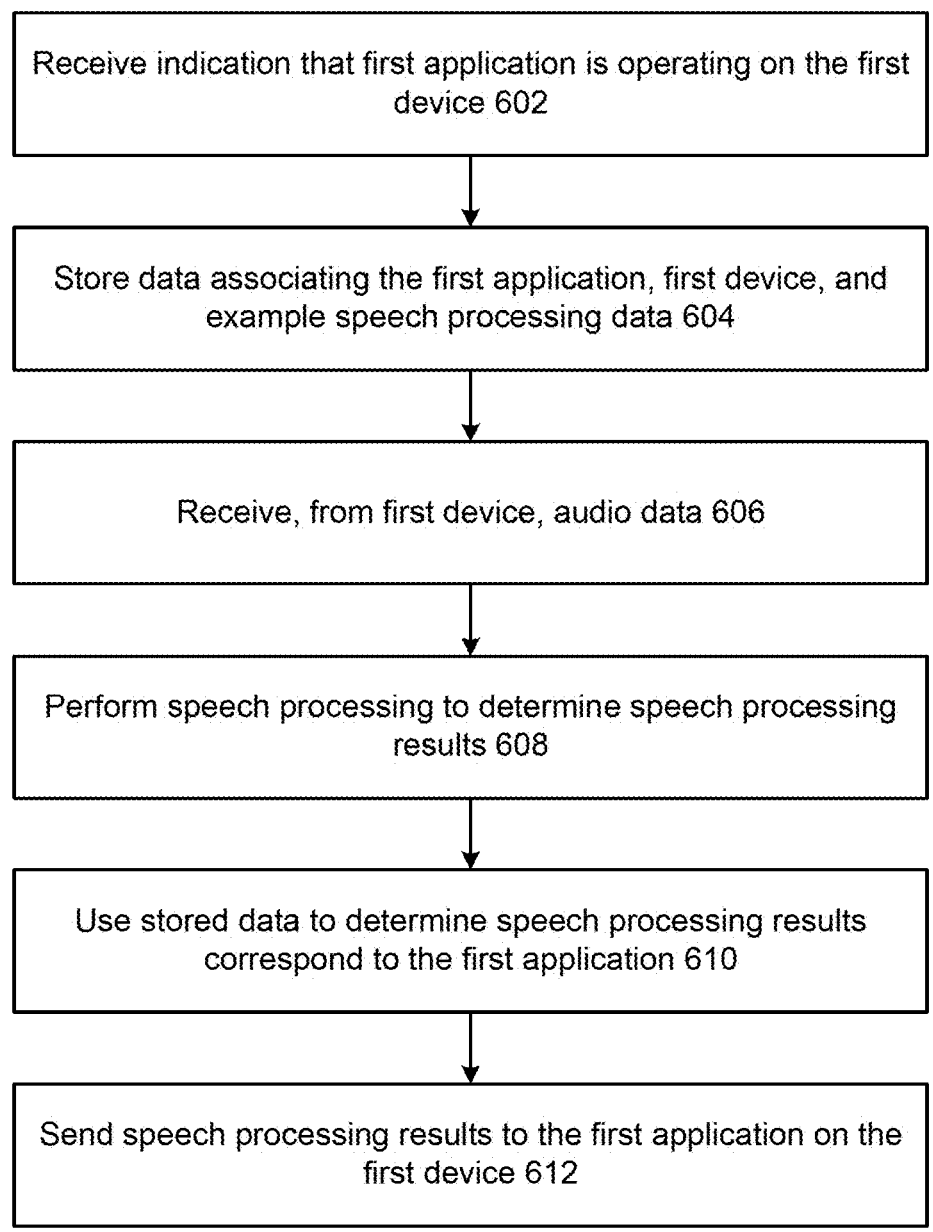
FIG. 6 illustrates operations by one or more remote system components performing speech processing with an on-device application acting as a speech-processing skill endpoint according to embodiments of the present disclosure.

FIG. 6 illustrates operations by one or more remote system component(s) 120 performing speech processing with an on-device application acting as a speech-processing skill endpoint according to embodiments of the present disclosure. The system component(s) 120 may receive (602) an indication that the first application 160 is operating on the first device 110. The system component(s) 120 may also receive metadata or other data indicating the speech processing data that the first application 160 may be configured to process. The system component(s) 120 may also determine this using data available from other sources. The system component(s) 120 may store (604) data associating the first application 160, the first device 110, and an indication of the speech processing data processable by the first application 160 (which may include, for example, an intent that is processable by the first application 160). Such data may be stored in a system skill registry 150. The system component(s) 120 may then receive (606), from the first device 110, audio data representing an utterance. The system component(s) 120 may perform (608) speech processing to determine speech processing results. The speech processing may use component(s) that were configured to use data corresponding to the first application 160. The system component(s) 120 may use (610) stored data (for example, from system skill registry 150) to determine that the speech processing results correspond to the first application 160. For example, an intent of the speech processing results may be one that is processable by the first application 160. The system component(s) 120 may send (612) the speech processing results to the first application 160, for further processing, for example determination of output data and presentation of same by the first device 110.

Figure 7:
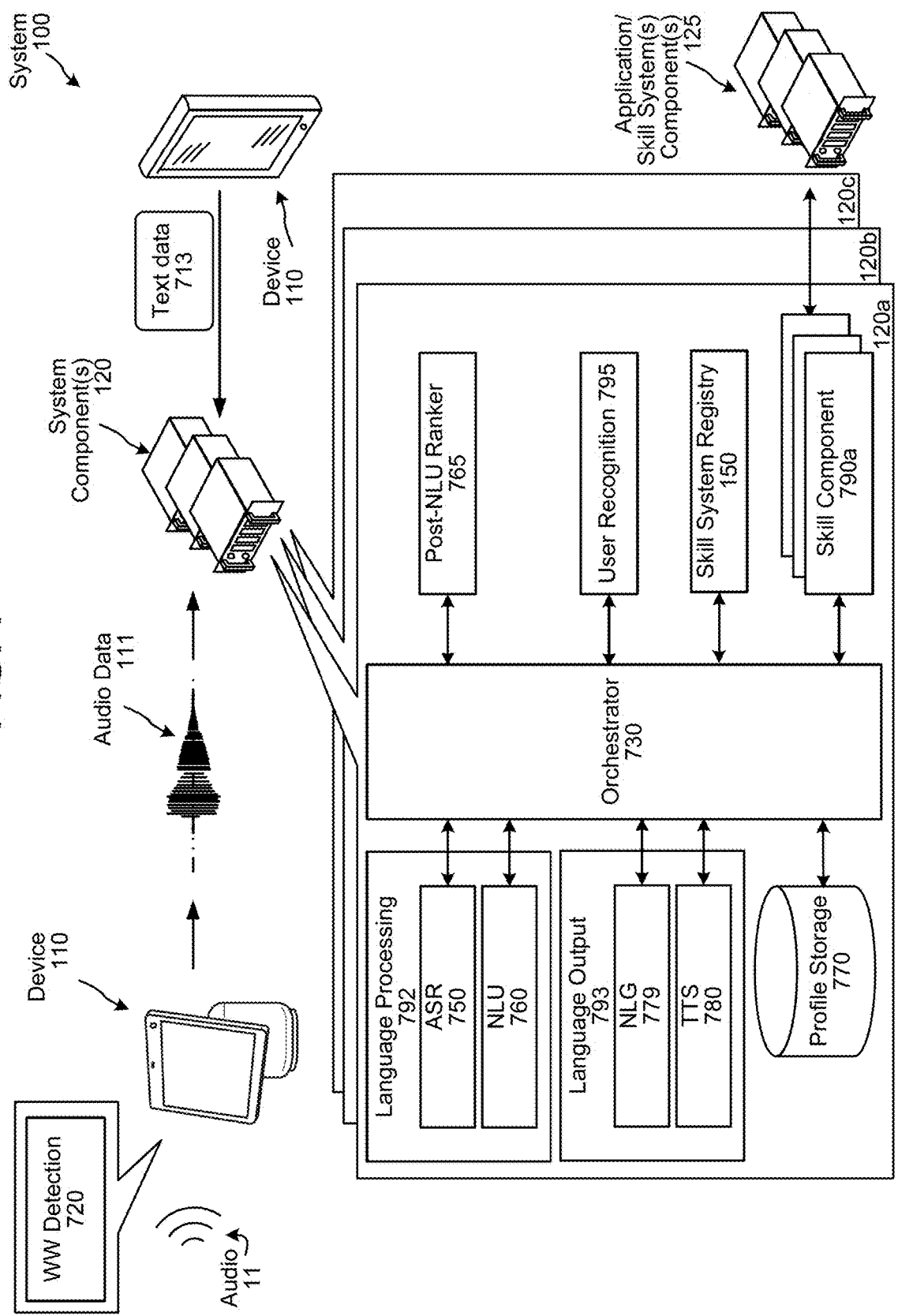
FIG. 7 is a conceptual diagram of components of the system, according to embodiments of the present disclosure.

The system 100 may operate using various components as described in FIG. 7. The various components may be located on same or different physical devices. Communication between various components may occur directly or across a network(s) (such as network 199 illustrated in FIG. 15). The device 110 may include audio capture component(s), such as a microphone or array of microphones of a device 110, captures audio 11 and creates corresponding audio data. Once speech is detected in audio data representing the audio 11, the device 110 may determine if the speech is directed at the device 110/system 120. In at least some embodiments, such determination may be made using a wakeword detection component 720. The wakeword detection component 720 may be configured to detect various wakewords. In at least some examples, each wakeword may correspond to a name of a different digital assistant. An example wakeword/digital assistant name is "Alexa." In another example, input to the system may be in form of text data 713, for example as a result of a user typing an input into a user interface of device 110. Other input forms may include indication that the user has pressed a physical or virtual button on device 110, the user has made a gesture, etc.

The wakeword detector 720 of the device 110 may process the audio data, representing the audio 11, to determine whether speech is represented therein. The device 110 may use various techniques to determine whether the audio data includes speech. In some examples, the device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a classifier configured to distinguish speech from background noise. The classifier may be implemented by techniques such as linear classifiers, support vector machines, and decision trees. In still other examples, the device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection can be performed without performing linguistic analysis, textual analysis, or semantic analysis. Instead, the audio data, representing the audio 11, is analyzed to determine if specific characteristics of the audio data match preconfigured acoustic waveforms, audio signatures, or other data corresponding to a wakeword.

Thus, the wakeword detection component 720 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 720 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detector 720 and/or input is detected by an input detector, the device 110 may "wake" and begin transmitting audio data 111, representing the audio 11, to the system(s) 120 or other component for speech processing. The audio data 111 may include data corresponding to the wakeword; in other embodiments, the portion of the audio corresponding to the wakeword is removed by the device 110 prior to sending the audio data 111 to the system(s) 120. In the case of touch input detection or gesture based input detection, the audio data may not include a wakeword.

In some implementations, the system 100 may include more than one set of system component(s) 120. The system component(s) 120 may respond to different wakewords and/or perform different categories of tasks. Each set of system component(s) 120 may be associated with its own wakeword such that speaking a certain wakeword results in audio data be sent to and processed by a particular system. For example, detection of the wakeword "Alexa" by the wakeword detector 720 may result in sending audio data to system component(s) 120*a* for processing while detection of the wakeword "Computer" by the wakeword detector may result in sending audio data to system component(s) 120*b* for processing. The system component(s) may have a separate wakeword and system for different skills/systems (e.g., "Dungeon Master" for a game play skill/system 120*c*) and/or such skills/systems may be coordinated by one or more skill(s) 790 of one or more system component(s) 120.

Upon receipt by the system(s) 120, the audio data 111 may be sent to an orchestrator component 730. The orchestrator component 730 may include memory and logic that enables the orchestrator component 730 to transmit various pieces and forms of data to various components of the system, as well as perform other operations as described herein.

The orchestrator component 730 may send the audio data 111 to a language processing component 792. The language processing component 792 (sometimes also referred to as a spoken language understanding (SLU) component) includes an automatic speech recognition (ASR) component 750 and a natural language understanding (NLU) component 760. The ASR component 750 may transcribe the audio data 111 into text data. The text data output by the ASR component 750 represents one or more than one (e.g., in the form of an N-best list) ASR hypotheses representing speech represented in the audio data 111. The ASR component 750 interprets the speech in the audio data 111 based on a similarity between the audio data 111 and pre-established language models. For example, the ASR component 750 may compare the audio data 111 with models for sounds (e.g., acoustic units such as phonemes, sensons, phones, etc.) and sequences of sounds to identify words that match the sequence of sounds of the speech represented in the audio data 111. The ASR component 750 sends the text data generated thereby to an NLU component 760, via, in some embodiments, the orchestrator component 730. The text data sent from the ASR component 750 to the NLU component 760 may include a single top-scoring ASR hypothesis or may include an N-best list including multiple top-scoring ASR hypotheses. An N-best list may additionally include a respective score associated with each ASR hypothesis represented therein. The ASR component 750 is described in greater detail below with regard to FIG. 9.

The speech processing system 792 may further include a NLU component 760. The NLU component 760 may receive the text data from the ASR component. The NLU component 760 may attempts to make a semantic interpretation of the phrase(s) or statement(s) represented in the text data input therein by determining one or more meanings associated with the phrase(s) or statement(s) represented in the text data. The NLU component 760 may determine an intent representing an action that a user desires be performed and may determine information that allows a device (e.g., the device 110, the system component(s) 120, a skill component 790, a skill system component(s) 125, etc.) to execute the intent. For example, if the text data corresponds to "play the 5$^{th}$ Symphony by Beethoven," the NLU component 760 may determine an intent that the system output music and may identify "Beethoven" as an artist/composer and "5$^{th}$ Symphony" as the piece of music to be played. For further example, if the text data corresponds to "what is the weather," the NLU component 760 may determine an intent that the system output weather information associated with a geographic location of the device 110. In another example, if the text data corresponds to "turn off the lights," the NLU component 760 may determine an intent that the system turn off lights associated with the device 110 or the user 5. However, if the NLU component 760 is unable to resolve the entity—for example, because the entity is referred to by anaphora such as "this song" or "my next appointment"— the speech processing system 792 can send a decode request to another speech processing system 792 for information regarding the entity mention and/or other context related to the utterance. The speech processing system 792 may augment, correct, or base results data upon the audio data 111 as well as any data received from the other speech processing system 792.

The NLU component 760 may return NLU results data 1185/1125 (which may include tagged text data, indicators of intent, etc.) back to the orchestrator 730. The orchestrator 730 may forward the NLU results data to a skill component(s) 790. If the NLU results data includes a single NLU hypothesis, the NLU component 760 and the orchestrator component 730 may direct the NLU results data to the skill component(s) 790 associated with the NLU hypothesis. If the NLU results data 1185/1125 includes an N-best list of NLU hypotheses, the NLU component 760 and the orchestrator component 730 may direct the top scoring NLU hypothesis to a skill component(s) 790 associated with the top scoring NLU hypothesis. The system may also include a post-NLU ranker 765 which may incorporate other information to rank potential interpretations determined by the NLU component 760. The local device 110 may also include its own post-NLU ranker 865, which may operate similarly to the post-NLU ranker 765. The NLU component 760, post-NLU ranker 765 and other components are described in greater detail below with regard to FIGS. 10 and 11.

A skill component may be software running on the system(s) 120 that is akin to a software application. That is, a skill component 790 may enable the system(s) 120 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The system(s) 120 may be configured with more than one skill component 790. For example, a weather service skill component may enable the system(s) 120 to provide weather information, a car service skill component may enable the system(s) 120 to book a trip with respect to a taxi or ride sharing service, a restaurant skill component may enable the system(s) 120 to order a pizza with respect to the restaurant's online ordering system, etc. A skill component 790 may operate in conjunction between the system(s) 120 and other devices, such as the device 110, in order to complete certain functions. Inputs to a skill component 790 may come from speech processing interactions or through other interactions or input sources. A skill component 790 may include hardware, software, firmware, or the like that may be dedicated to a particular skill component 790 or shared among different skill components 790.

A skill support system(s) component(s) 125 may communicate with a skill component(s) 790 within the system component(s) 120 and/or directly with the orchestrator component 730 or with other components. A skill support system(s) component(s) 125 may be configured to perform one or more actions. An ability to perform such action(s) may sometimes be referred to as a "skill." That is, a skill may enable a skill support system(s) component(s) 125 to execute specific functionality in order to provide data or perform some other action requested by a user. For example, a weather service skill may enable a skill support system(s) component(s) 125 to provide weather information to the system(s) 120, a car service skill may enable a skill support system(s) component(s) 125 to book a trip with respect to a taxi or ride sharing service, an order pizza skill may enable a skill support system(s) component(s) 125 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill. As noted above, an application 160 operating on device 110 may be configured to act as a skill in that it may receive NLU output data to execute a particular functionality.

The system component(s) 120 may be configured with a skill component 790 dedicated to interacting with the skill support system(s) component(s) 125. Unless expressly stated otherwise, reference to a skill, skill device, or skill component may include a skill component 790 operated by the system component(s) 120 and/or skill operated by the skill support system(s) 125. Moreover, the functionality described herein as a skill or skill may be referred to using many different terms, such as an action, bot, app, or the like. The skill 790 and or skill support system(s) 125 may return output data to the orchestrator 730.

The system component(s) 120 may include a language output component 793. The language output component 793 includes a natural language generation (NLG) component 779 and a text-to-speech (TTS) component 780. The NLG component 779 can generate text for purposes of TTS output to a user. For example the NLG component 779 may generate text corresponding to instructions corresponding to a particular action for the user to perform. The NLG component 779 may generate appropriate text for various outputs as described herein. The NLG component 779 may include one or more trained models configured to output text appropriate for a particular input. The text output by the NLG component 779 may become input for the TTS component 780. Alternatively or in addition, the TTS component 780 may receive text data from a skill 790 or other system component for output.

The NLG component 779 may include a trained model. The NLG component 779 generates text data such that the output text data has a natural feel and, in some embodiments, includes words and/or phrases specifically formatted for a requesting individual. The NLG may use templates to formulate responses. And/or the NLG system may include models trained from the various templates for forming the output text data. For example, the NLG system may analyze transcripts of local news programs, television shows, sporting events, or any other media program to obtain common components of a relevant language and/or region. As one illustrative example, the NLG system may analyze a transcription of a regional sports program to determine commonly used words or phrases for describing scores or other sporting news for a particular region. The NLG may further receive, as inputs, a dialog history, an indicator of a level of formality, and/or a command history or other user history such as the dialog history.

The NLG system may generate dialog data based on one or more response templates. Further continuing the example above, the NLG system may select a template in response to the question, "What is the weather currently like?" of the form: "The weather currently is $weather_information$." The NLG system may analyze the logical form of the template to produce one or more textual responses including markups and annotations to familiarize the response that is generated. In some embodiments, the NLG system may determine which response is the most appropriate response to be selected. The selection may, therefore, be based on past responses, past questions, a level of formality, and/or any other feature, or any other combination thereof. Responsive audio data representing the response generated by the NLG system may then be generated using the text-to-speech component 780.

The TTS component 780 may generate audio data (e.g., synthesized speech) from text data using one or more different methods. Text data input to the TTS component 780 may come from a skill component 790, the orchestrator component 730, or another component of the system. In one method of synthesis called unit selection, the TTS component 780 matches text data against a database of recorded speech. The TTS component 780 selects matching units of recorded speech and concatenates the units together to form audio data. In another method of synthesis called parametric synthesis, the TTS component 780 varies parameters such as frequency, volume, and noise to create audio data including an artificial speech waveform. Parametric synthesis uses a computerized voice generator, sometimes called a vocoder.

The system(s) 120 may include a user recognition component 795 that recognizes one or more users using a variety of data. However, the disclosure is not limited thereto, and the device 110 may include a user recognition component 895 instead of and/or in addition to user recognition component 795 of the system(s) 120 without departing from the disclosure. User recognition component 895 operates similarly to user recognition component 795.

The user-recognition component 795 may take as input the audio data 111 and/or text data output by the ASR component 750. The user-recognition component 795 may perform user recognition by comparing audio characteristics in the audio data 111 to stored audio characteristics of users. The user-recognition component 795 may also perform user recognition by comparing biometric data (e.g., fingerprint data, iris data, etc.), received by the system in correlation with the present user input, to stored biometric data of users assuming user permission and previous authorization. The user-recognition component 795 may further perform user recognition by comparing image data (e.g., including a representation of at least a feature of a user), received by the system in correlation with the present user input, with stored image data including representations of features of different users. The user-recognition component 795 may perform additional user recognition processes, including those known in the art.

The user-recognition component 795 determines scores indicating whether user input originated from a particular user. For example, a first score may indicate a likelihood that the user input originated from a first user, a second score may indicate a likelihood that the user input originated from a second user, etc. The user-recognition component 795 also determines an overall confidence regarding the accuracy of user recognition operations.

Output of the user-recognition component 795 may include a single user identifier corresponding to the most likely user that originated the user input. Alternatively, output of the user-recognition component 795 may include an N-best list of user identifiers with respective scores indicating likelihoods of respective users originating the user input. The output of the user-recognition component 795 may be used to inform NLU processing as well as processing performed by other components of the system.

The system 100 (either on device 110, system 120, or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 770 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a device 110, the user profile (associated with the presented login information) may be updated to include information about the device 110, for example with an indication that the device is currently in use. Each user profile may include identifiers of skills that the user has enabled. When a user enables a skill, the user is providing the system 120 with permission to allow the skill to execute with respect to the user's natural language user inputs. If a user does not enable a skill, the system 120 may not invoke the skill to execute with respect to the user's natural language user inputs.

The profile storage 770 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 770 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

Although the components of FIG. 7 may be illustrated as part of system component(s) 120, device 110, or otherwise, the components may be arranged in other device(s) (such as in device 110 if illustrated in system component(s) 120 or vice-versa, or in other device(s) altogether) without departing from the disclosure. FIG. 8 illustrates such a configured device 110.

In at least some embodiments, the system component(s) 120 may receive the audio data 111 from the device 110, to recognize speech corresponding to a spoken input in the received audio data 111, and to perform functions in response to the recognized speech. In at least some embodiments, these functions involve sending directives (e.g., commands), from the system 120 to the device 110 (and/or other devices 110) to cause the device 110 to perform an action, such as output an audible response to the spoken input via a loudspeaker(s), and/or control secondary devices in the environment by sending a control command to the secondary devices.

Thus, when the device 110 is able to communicate with the system component(s) 120 over the network(s) 199, some or all of the functions capable of being performed by the system component(s) 120 may be performed by sending one or more directives over the network(s) 199 to the device 110, which, in turn, may process the directive(s) and perform one or more corresponding actions. For example, the system component(s) 120, using a remote directive that is included in response data (e.g., a remote response), may instruct the device 110 to output an audible response (e.g., using TTS processing performed by an on-device TTS component 880) to a user's question via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a secondary device (e.g., a directive to turn on a smart light). It is to be appreciated that the system 120 may be configured to provide other functions in addition to those discussed herein, such as, without limitation, providing step-by-step directions for navigating from an origin location to a destination location, conducting an electronic commerce transaction on behalf of the user 105 as part of a shopping function, establishing a communication session (e.g., a video call) between the user 105 and another user, and so on. The device 110 and system component(s) 120 may thus coordinate to process data for an utterance and respond accordingly thereto. This may involve speech processing being performed by the device 110 and/or the system component(s) 120 to respond to an utterance in a hybrid manner.

As noted with respect to FIG. 7, the device 110 may include a wakeword detection component 720 configured to compare the audio data 111 to stored models used to detect a wakeword (e.g., "Alexa") that indicates to the device 110 that the audio data 111 is to be processed for determining NLU output data (e.g., slot data that corresponds to a named entity, label data, and/or intent data, etc.). In at least some embodiments, a hybrid selector 824, of the device 110, may send the audio data 111 to the wakeword detection component 720. If the wakeword detection component 720 detects a wakeword in the audio data 111, the wakeword detection component 720 may send an indication of such detection to the hybrid selector 824. In response to receiving the indication, the hybrid selector 824 may send the audio data 111 to the system component(s) 120 and/or the ASR component 850. The wakeword detection component 720 may also send an indication, to the hybrid selector 824, representing a wakeword was not detected. In response to receiving such an indication, the hybrid selector 824 may refrain from sending the audio data 111 to the system component(s) 120, and may prevent the ASR component 850 from further processing the audio data 111. In this situation, the audio data 111 can be discarded.

The device 110 may conduct its own speech processing using on-device language processing components, such as an SLU/language processing component 892 (which may include an ASR component 850 and an NLU 860), similar to the manner discussed herein with respect to the SLU component 792 (or ASR component 750 and the NLU component 760) of the system 120. Language processing component 892 may operate similarly to language processing component 792, ASR component 850 may operate similarly to ASR component 750 and NLU component 860 may operate similarly to NLU component 760.

As described above, the device 110 may also internally include, or otherwise have access to, other components such as one or more application/skill components 160 capable of executing commands based on NLU output data or other results determined by the device 110/system 120 (which may operate similarly to skill components 790), a user recognition component 895 (configured to process in a similar manner to that discussed herein with respect to the user recognition component 795 of the system 120), profile storage 870 (configured to store similar profile data to that discussed herein with respect to the profile storage 770 of the system 120), or other components. In at least some embodiments, the profile storage 870 may only store profile data for a user or group of users specifically associated with the device 110. Similar to as described above with respect to skill component 790, an application/skill component 160 may communicate with a skill system(s) component(s) 125. The device 110 may also have its own language output component 893 which may include NLG component 879 and TTS component 880. Language output component 893 may operate similarly to language processing component 793, NLG component 879 may operate similarly to NLG component 779 and TTS component 880 may operate similarly to TTS component 780.

In at least some embodiments, the on-device language processing components may not have the same capabilities as the language processing components of the system component(s) 120. For example, the on-device language processing components may be configured to handle only a subset of the natural language user inputs that may be handled by the system component(s) 120. For example, such subset of natural language user inputs may correspond to local-type natural language user inputs, such as those controlling devices or components associated with a user's home. In such circumstances the on-device language processing components may be able to more quickly interpret and respond to a local-type natural language user input, for example, than processing that involves the system 120. If the device 110 attempts to process a natural language user input for which the on-device language processing components are not necessarily best suited, the language processing results determined by the device 110 may indicate a low confidence or other metric indicating that the processing by the device 110 may not be as accurate as the processing done by the system 120.

The hybrid selector 824, of the device 110, may include a hybrid proxy (HP) 826 configured to proxy traffic to/from the system 120. For example, the HP 826 may be configured to send messages to/from a hybrid execution controller (HEC) 827 of the hybrid selector 824. For example, command/directive data received from the system 120 can be sent to the HEC 827 using the HP 826. The HP 826 may also be configured to allow the audio data 111 to pass to the system 120 while also receiving (e.g., intercepting) this audio data 111 and sending the audio data 111 to the HEC 827.

In at least some embodiments, the hybrid selector 824 may further include the device speech orchestrator (DSO) 830 configured to notify the ASR component 850 about the availability of new audio data 111 that represents user speech, and to otherwise initiate the operations of local language processing (e.g., processing on device 110) when new audio data 111 becomes available. In general, the hybrid selector 824 may control execution of local language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the device 110 receives directive data from the system 120 and chooses to use that remotely-determined directive data.

Thus, when the audio data 111 is received, the HP 826 may allow the audio data 111 to pass through to the system 120 and the HP 826 may also input the audio data 111 to the on-device ASR component 850 by routing the audio data 111 through the HEC 827 of the hybrid selector 824, whereby the DSO 830 notifies the ASR component 850 of the audio data 111. At this point, the hybrid selector 824 may wait for response data from either or both of the system 120 or the local language processing components. However, the disclosure is not limited thereto, and in some examples the hybrid selector 824 may send the audio data 111 only to the local ASR component 850 without departing from the disclosure. For example, the device 110 may process the audio data 111 locally without sending the audio data 111 to the system 120.

The local ASR component 850 is configured to receive the audio data 111 from the hybrid selector 824, and to recognize speech in the audio data 111, and the local NLU component 860 is configured to determine a user intent from the recognized speech, and to determine how to act on the user intent by generating NLU output data which may include directive data (e.g., instructing a component to perform an action). Such NLU output data may take a form similar to that as determined by the NLU component 760 of the system 120. In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

An NLU hypothesis (output by the NLU component 860) may be selected as usable to respond to a natural language user input, and local response data may be sent (e.g., local NLU output data, local knowledge base information, internet search results, and/or local directive data) to the hybrid selector 824, such as a "ReadyToExecute" response. The hybrid selector 824 may then determine whether to use directive data from the on-device components to respond to the natural language user input, to use directive data received from the system 120, assuming a remote response is even received (e.g., when the device 110 is able to access the system 120 over the network(s) 199), or to determine output audio requesting additional information from the user 5.

The device 110 and/or the system component(s) 120 may associate a unique identifier with each natural language user input. The device 110 may include the unique identifier when sending the audio data 111 to the system component(s) 120 (or internal speech processing component(s), and the response data from the system 120 may include the unique identifier to identify which natural language user input the response data corresponds.

In at least some embodiments, the device 110 may include, or be configured to use, one or more application/skill component(s) 160 that may work similarly to the skill component(s) 790 implemented by the system 120. The application/skill component(s) 160 may correspond to one or more domains that are used in order to determine how to act on a spoken input in a particular way, such as by outputting a directive that corresponds to the determined intent, and which can be processed to implement the desired operation. The application/skill component(s) 160 installed on the device 110 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, game applications, and/or the like.

Additionally or alternatively, the device 110 may be in communication with one or more skill systems component(s) 125. For example, a skill system component(s) 125 may be located in a remote environment (e.g., separate location) such that the device 110 may only communicate with the skill system component(s) 125 via the network(s) 199. However, the disclosure is not limited thereto. For example, in at least some embodiments, a skill system component(s) 125 may be configured in a local environment (e.g., home server and/or the like) such that the device 110 may communicate with the skill system component(s) 125 via a private network 10, such as a local area network (LAN).

Similar to the manner discussed with regard to FIG. 7, the local device 110 may be configured to recognize multiple different wakewords and/or perform different categories of tasks depending on the wakeword. Such different wakewords may invoke different processing components of local device 110 (not illustrated in FIG. 8). For example, detection of the wakeword "Alexa" by the wakeword detector 720 may result in sending audio data to certain language processing components 892/application/skill component(s) 160 for processing while detection of the wakeword "Computer" by the wakeword detector may result in sending audio data different language processing components 892/application/skill component(s) 160 for processing.

Figure 9:
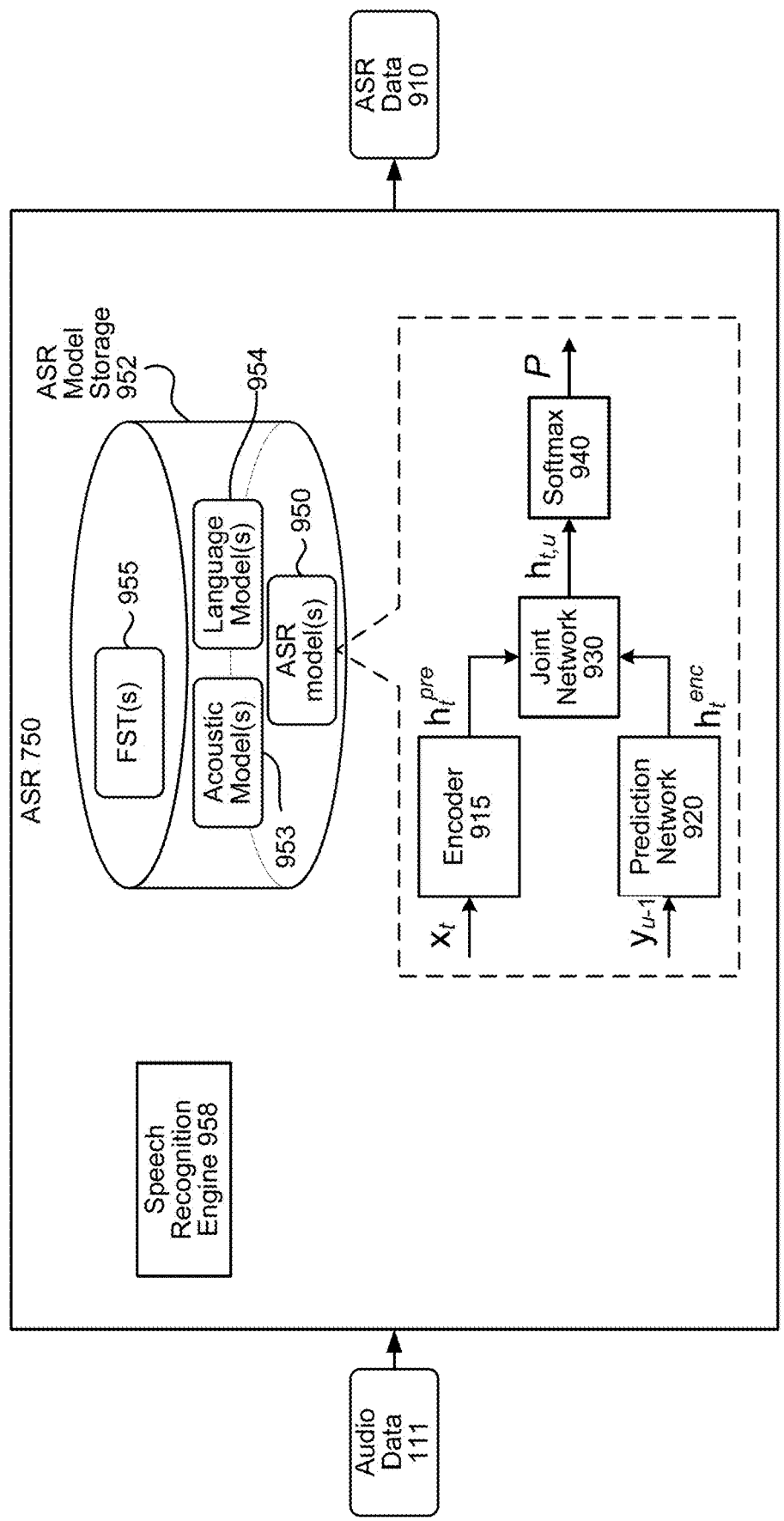
FIG. 9 is a conceptual diagram of an ASR component, according to embodiments of the present disclosure.

FIG. 9 is a conceptual diagram of an ASR component 750, according to embodiments of the present disclosure. The ASR component 750 may interpret a spoken natural language input based on the similarity between the spoken natural language input and pre-established language models 954 stored in an ASR model storage 952. For example, the ASR component 750 may compare the audio data with models for sounds (e.g., subword units or phonemes) and sequences of sounds to identify words that match the sequence of sounds spoken in the natural language input. Alternatively, the ASR component 750 may use a finite state transducer (FST) 955 to implement the language model functions.

When the ASR component 750 generates more than one ASR hypothesis for a single spoken natural language input, each ASR hypothesis may be assigned a score (e.g., probability score, confidence score, etc.) representing a likelihood that the corresponding ASR hypothesis matches the spoken natural language input (e.g., representing a likelihood that a particular set of words matches those spoken in the natural language input). The score may be based on a number of factors including, for example, the similarity of the sound in the spoken natural language input to models for language sounds (e.g., an acoustic model 953 stored in the ASR model storage 952), and the likelihood that a particular word, which matches the sounds, would be included in the sentence at the specific location (e.g., using a language or grammar model 954). Based on the considered factors and the assigned confidence score, the ASR component 750 may output an ASR hypothesis that most likely matches the spoken natural language input, or may output multiple ASR hypotheses in the form of a lattice or an N-best list, with each ASR hypothesis corresponding to a respective score.

The ASR component 750 may include a speech recognition engine 958. The ASR component 750 receives audio data 111 (for example, received from a local device 110 having processed audio detected by a microphone by an acoustic front end (AFE) or other component). The speech recognition engine 958 compares the audio data 111 with acoustic models 953, language models 954, FST(s) 955, and/or other data models and information for recognizing the speech conveyed in the audio data. The audio data 111 may be audio data that has been digitized (for example by an AFE) into frames representing time intervals for which the AFE determines a number of values, called features, representing the qualities of the audio data, along with a set of those values, called a feature vector, representing the features/qualities of the audio data within the frame. In at least some embodiments, audio frames may be 10 ms each. Many different features may be determined, as known in the art, and each feature may represent some quality of the audio that may be useful for ASR processing. A number of approaches may be used by an AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art. In some cases, feature vectors of the audio data may arrive at the supporting device(s) 120 encoded, in which case they may be decoded by the speech recognition engine 958 and/or prior to processing by the speech recognition engine 958.

In some implementations, the ASR component 750 may process the audio data 111 using the ASR model 950. The ASR model 950 may be, for example, a recurrent neural network such as an RNN-T. An example RNN-T architecture is illustrated in FIG. 9. The ASR model 950 may predict a probability (y|x) of labels y=(y$_1$, . . . y$_u$) given acoustic features x=(x$_1$, . . . , x$_t$). During inference, the ASR model 950 can generate an N-best list using, for example, a beam search decoding algorithm. The ASR model 950 may include an encoder 915, a prediction network 920, a joint network 930, and a softmax 940. The encoder 915 may be similar or analogous to an acoustic model (e.g., similar to the acoustic model 953 described below), and may process a sequence of acoustic input features to generate encoded hidden representations. The prediction network 920 may be similar or analogous to a language model (e.g., similar to the language model 954 described below), and may process the previous output label predictions, and map them to corresponding hidden representations. The joint network 930 may be, for example, a feed forward neural network (NN) that may process hidden representations from both the encoder 915 and prediction network 920, and predict output label probabilities. The softmax 940 may be a function implemented (e.g., as a layer of the joint network 930) to normalize the predicted output probabilities.

The speech recognition engine 958 may process the audio data 111 with reference to information stored in the ASR model storage 952. Feature vectors of the audio data 111 may arrive at the system 120 encoded, in which case they may be decoded prior to processing by the speech recognition engine 958.

The speech recognition engine 958 attempts to match received feature vectors to language acoustic units (e.g., phonemes) and words as known in the stored acoustic models 953, language models 7B54, and FST(s) 955. For example, audio data 111 may be processed by one or more acoustic model(s) 953 to determine acoustic unit data. The acoustic unit data may include indicators of acoustic units detected in the audio data 111 by the ASR component 750. For example, acoustic units can consist of one or more of phonemes, diaphonemes, tonemes, phones, diphones, triphones, or the like. The acoustic unit data can be represented using one or a series of symbols from a phonetic alphabet such as the X-SAMPA, the International Phonetic Alphabet, or Initial Teaching Alphabet (ITA) phonetic alphabets. In some implementations a phoneme representation of the audio data can be analyzed using an n-gram based tokenizer. An entity, or a slot representing one or more entities, can be represented by a series of n-grams.

The acoustic unit data may be processed using the language model 954 (and/or using FST 955) to determine ASR data 910. The ASR data 910 can include one or more hypotheses. One or more of the hypotheses represented in the ASR data 910 may then be sent to further components (such as the NLU component 760) for further processing as discussed herein. The ASR data 910 may include representations of text of an utterance, such as words, subword units, or the like.

The speech recognition engine 958 computes scores for the feature vectors based on acoustic information and language information. The acoustic information (such as identifiers for acoustic units and/or corresponding scores) is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR component 750 will output ASR hypotheses that make sense grammatically. The specific models used may be general models or may be models corresponding to a particular domain, such as music, banking, etc.

The speech recognition engine 958 may use the acoustic model(s) 953 to attempt to match received audio feature vectors to words or subword acoustic units. An acoustic unit may be a senone, phoneme, phoneme in context, syllable, part of a syllable, syllable in context, or any other such portion of a word. The speech recognition engine 958 computes recognition scores for the feature vectors based on acoustic information and language information. The acoustic information is used to calculate an acoustic score representing a likelihood that the intended sound represented by a group of feature vectors match a subword unit. The language information is used to adjust the acoustic score by considering what sounds and/or words are used in context with each other, thereby improving the likelihood that the ASR component 750 outputs ASR hypotheses that make sense grammatically.

The speech recognition engine 958 may use a number of techniques to match feature vectors to phonemes or other acoustic units, such as diphones, triphones, etc. One common technique is using Hidden Markov Models (HMMs). HMMs are used to determine probabilities that feature vectors may match phonemes. Using HMMs, a number of states are presented, in which the states together represent a potential phoneme (or other acoustic unit, such as a triphone) and each state is associated with a model, such as a Gaussian mixture model or a deep belief network. Transitions between states may also have an associated probability, representing a likelihood that a current state may be reached from a previous state. Sounds received may be represented as paths between states of the HMM and multiple paths may represent multiple possible text matches for the same sound. Each phoneme may be represented by multiple potential states corresponding to different known pronunciations of the phonemes and their parts (such as the beginning, middle, and end of a spoken language sound). An initial determination of a probability of a potential phoneme may be associated with one state. As new feature vectors are processed by the speech recognition engine 958, the state may change or stay the same, based on the processing of the new feature vectors. A Viterbi algorithm may be used to find the most likely sequence of states based on the processed feature vectors. Further techniques, such as using FSTs, may also be used.

In one example, the ASR engine 958 may receive a series of feature vectors for sound corresponding to a user saying "Hello how are you." The ASR engine 958 may attempt to match each feature vector with a phoneme. As new feature vectors are processed, the ASR engine 958 may determine state transitions (for example, using HMMs) to determine whether a probability of whether a state should either remain the same, or change to a new state, i.e., whether an incoming feature vector results in a state transition from one phone to another. As the processing continues, the ASR engine 958 continues calculating such state transition probabilities. After processing one feature vector, the speech recognition may move to the next feature vector.

Probabilities and states may be calculated using a number of techniques. For example, probabilities for each state may be calculated using a Gaussian model, Gaussian mixture model, or other technique based on the feature vectors. Techniques such as maximum likelihood estimation (MLE) may be used to estimate the probability of phoneme states.

In addition to calculating potential states for one phoneme as a potential match to a feature vector, the ASR engine 958 may also calculate potential states for other phonemes. In this manner multiple states and state transition probabilities may be calculated.

The probable states and probable state transitions calculated by the ASR engine 958 are formed into paths. Each path represents a progression of phonemes that potentially match the audio data represented by the feature vectors. One path may overlap with one or more other paths depending on the recognition scores calculated for each phoneme. Certain probabilities are associated with each transition from state to state. A cumulative path score may also be calculated for each path. This process of determining scores based on the feature vectors may be called acoustic modeling. When combining scores as part of the ASR processing, scores may be multiplied together (or combined in other ways) to reach a desired combined score or probabilities may be converted to the log domain and added to assist processing.

The speech recognition engine 958 may also compute scores of branches of the paths based on language models or grammars. Language modeling involves determining scores for what words are likely to be used together to form coherent words and sentences. Application of a language model may improve the likelihood that the ASR module 750 correctly interprets the speech contained in the audio data. For example, for an input audio sounding like "hello," acoustic model processing that returns the potential phoneme paths of "H E L O", "H A L O", and "Y E L O" may be adjusted by a language model to adjust the recognition scores of "H E L O" (interpreted as the word "hello"), "H A L O" (interpreted as the word "halo"), and "Y E L O" (interpreted as the word "yellow") based on the language context of each word within the spoken utterance.

During runtime ASR processing, the ASR engine 958 may take incoming audio feature vectors corresponding to audio frames and may process them with an acoustic model 953. For each processed feature vector, the acoustic model processing will then result in acoustic model output including a list of potential acoustic units corresponding to the feature vector along with a corresponding list of acoustic scores for the respective potential acoustic units. The ASR engine 958 will then identify those acoustic units in the input labels of particular states currently under consideration at the FST and will rescore the arcs associated with those acoustic units using both the acoustic scores and the scores of the arcs built into the FST. The highest scoring ASR hypothesis/hypotheses (along with their respective scores) may be output as ASR data 910.

The orchestrator component 730 may send text data (e.g., one or more ASR hypotheses 910 output by the ASR component 750 to an NLU component 760 for NLU processing.

The NLU component 760 may perform natural language processing (as described below) with respect to the ASR data 910. Operation of the NLU component 760 is described further below with reference to FIGS. 10 and 11.

Figure 10:
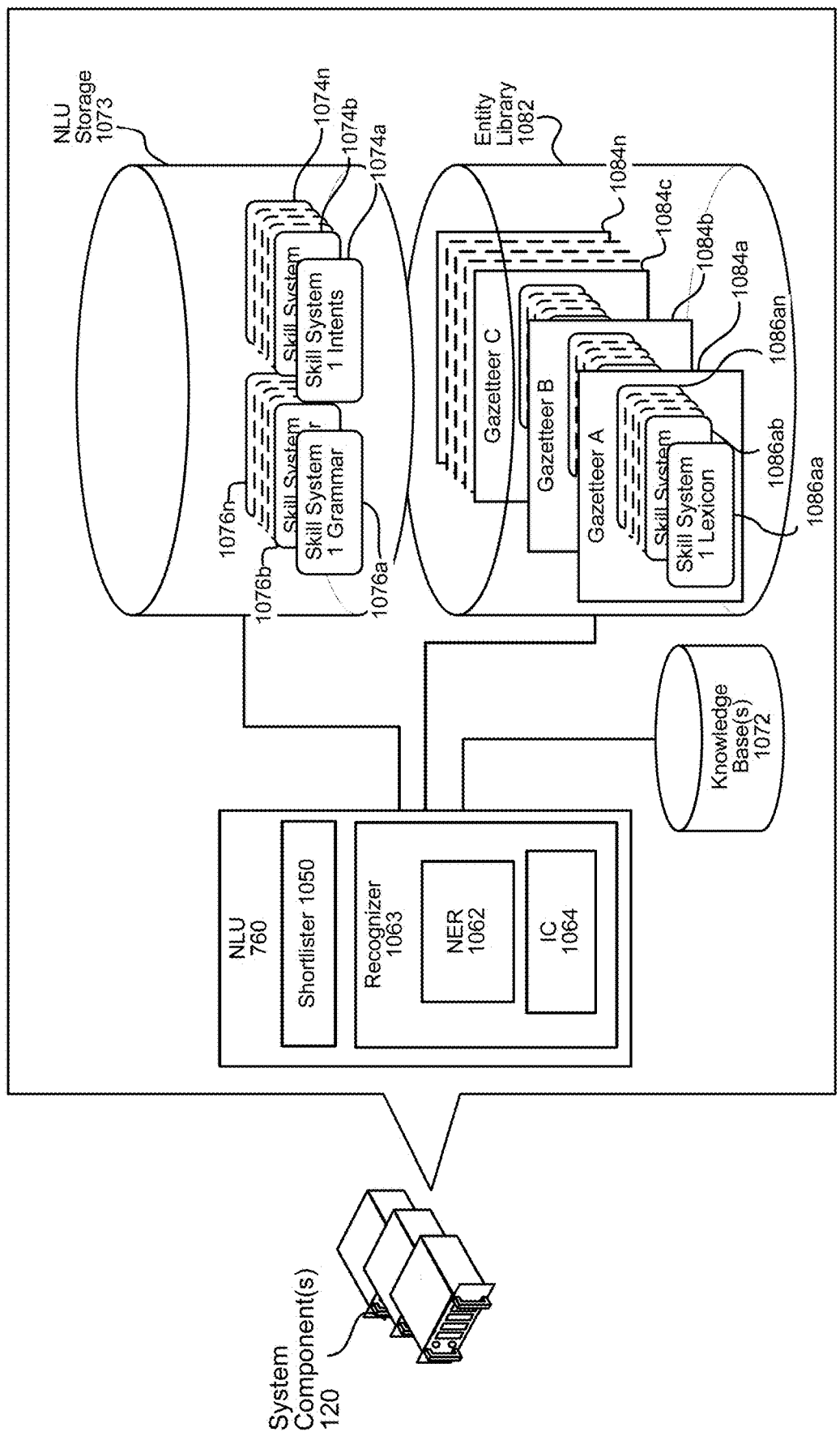
FIG. 10 is a conceptual diagram of how natural language processing is performed, according to embodiments of the present disclosure.
Figure 11:
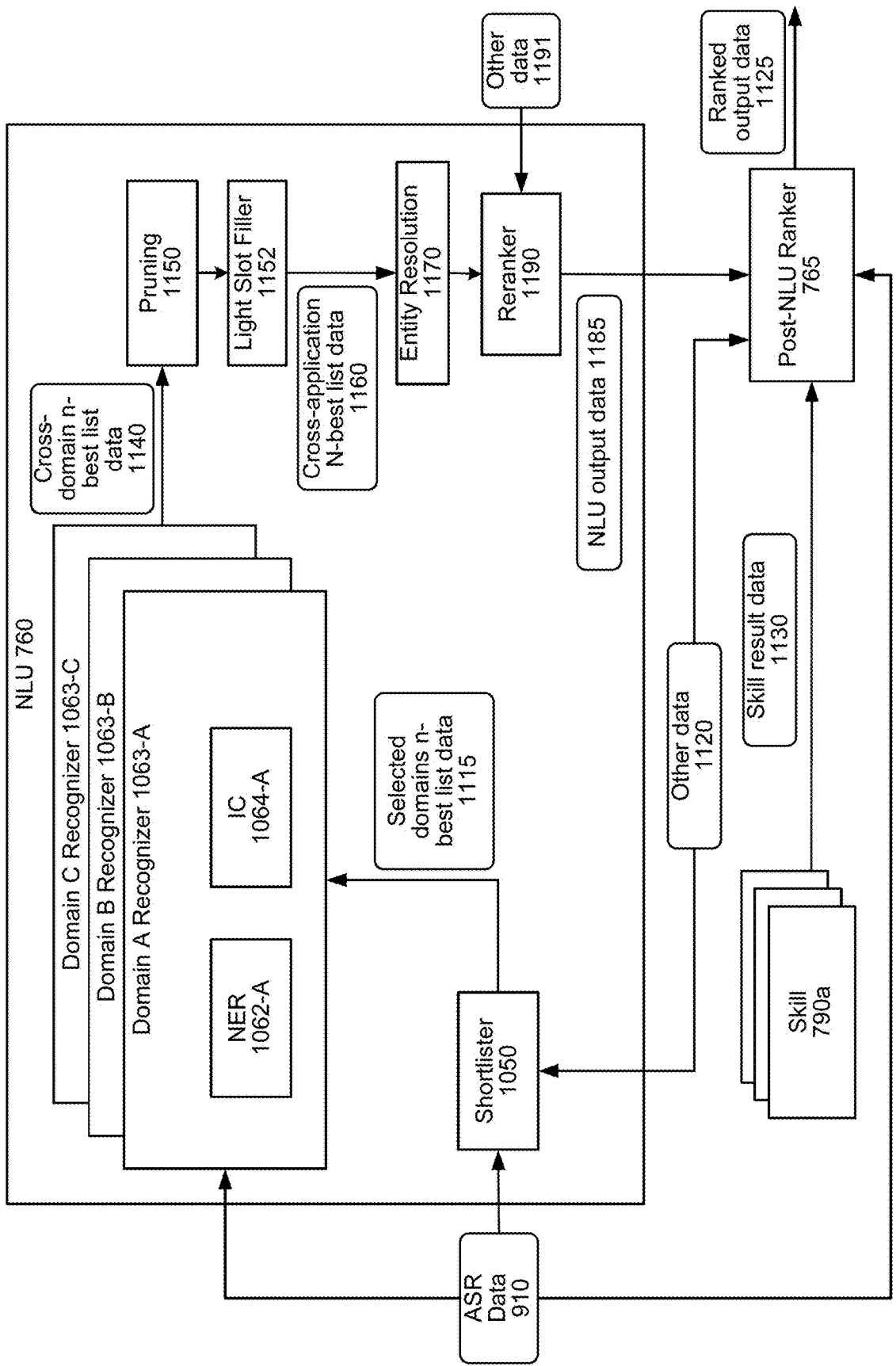
FIG. 11 is a conceptual diagram of how natural language processing is performed, according to embodiments of the present disclosure.

FIGS. 10 and 11 illustrates how the NLU component 760 may perform NLU processing. FIG. 10 is a conceptual diagram of how natural language processing is performed, according to embodiments of the present disclosure. And FIG. 11 is a conceptual diagram of how natural language processing is performed, according to embodiments of the present disclosure.

FIG. 10 illustrates how NLU processing is performed on text data. The NLU component 760 may process text data including several ASR hypotheses of a single user input. For example, if the ASR component 750 outputs text data including an n-best list of ASR hypotheses, the NLU component 760 may process the text data with respect to all (or a portion of) the ASR hypotheses represented therein.

The NLU component 760 may annotate text data by parsing and/or tagging the text data. For example, for the text data "tell me the weather for Seattle," the NLU component 760 may tag "tell me the weather for Seattle" as an <OutputWeather> intent as well as separately tag "Seattle" as a location for the weather information.

The NLU component 760 may include a shortlister component 1050. The shortlister component 1050 selects skills that may execute with respect to ASR output data 910 input to the NLU component 760 (e.g., applications that may execute with respect to the user input). The ASR output data 910 (which may also be referred to as ASR data 910) may include representations of text of an utterance, such as words, subword units, or the like. The shortlister component 1050 thus limits downstream, more resource intensive NLU processes to being performed with respect to skills that may execute with respect to the user input.

Without a shortlister component 1050, the NLU component 760 may process ASR output data 910 input thereto with respect to every skill of the system, either in parallel, in series, or using some combination thereof. By implementing a shortlister component 1050, the NLU component 760 may process ASR output data 910 with respect to only the skills that may execute with respect to the user input. This reduces total compute power and latency attributed to NLU processing.

The shortlister component 1050 may include one or more trained models. The model(s) may be trained to recognize various forms of user inputs that may be received by the system(s) 120. For example, during a training period skill system(s) 125 associated with a skill may provide the system(s) 120 with training text data representing sample user inputs that may be provided by a user to invoke the skill. For example, for a ride sharing skill, a skill system(s) 125 associated with the ride sharing skill may provide the system(s) 120 with training text data including text corresponding to "get me a cab to [location]," "get me a ride to [location]," "book me a cab to [location]," "book me a ride to [location]," etc. The one or more trained models that will be used by the shortlister component 1050 may be trained, using the training text data representing sample user inputs, to determine other potentially related user input structures that users may try to use to invoke the particular skill. During training, the system(s) 120 may solicit the skill system(s) 125 associated with the skill regarding whether the determined other user input structures are permissible, from the perspective of the skill system(s) 125, to be used to invoke the skill. The alternate user input structures may be derived by one or more trained models during model training and/or may be based on user input structures provided by different skills. The skill system(s) 125 associated with a particular skill may also provide the system(s) 120 with training text data indicating grammar and annotations. The system(s) 120 may use the training text data representing the sample user inputs, the determined related user input(s), the grammar, and the annotations to train a model(s) that indicates when a user input is likely to be directed to/handled by a skill, based at least in part on the structure of the user input. Each trained model of the shortlister component 1050 may be trained with respect to a different skill. Alternatively, the shortlister component 1050 may use one trained model per domain, such as one trained model for skills associated with a weather domain, one trained model for skills associated with a ride sharing domain, etc.

The system(s) 120 may use the sample user inputs provided by a skill system(s) 125, and related sample user inputs potentially determined during training, as binary examples to train a model associated with a skill associated with the skill system(s) 125. The model associated with the particular skill may then be operated at runtime by the shortlister component 1050. For example, some sample user inputs may be positive examples (e.g., user inputs that may be used to invoke the skill). Other sample user inputs may be negative examples (e.g., user inputs that may not be used to invoke the skill).

As described above, the shortlister component 1050 may include a different trained model for each skill of the system, a different trained model for each domain, or some other combination of trained model(s). For example, the shortlister component 1050 may alternatively include a single model. The single model may include a portion trained with respect to characteristics (e.g., semantic characteristics) shared by all skills of the system. The single model may also include skill-specific portions, with each skill-specific portion being trained with respect to a specific skill of the system. Implementing a single model with skill-specific portions may result in less latency than implementing a different trained model for each skill because the single model with skill-specific portions limits the number of characteristics processed on a per skill level.

The portion trained with respect to characteristics shared by more than one skill may be clustered based on domain. For example, a first portion of the portion trained with respect to multiple skills may be trained with respect to weather domain skills, a second portion of the portion trained with respect to multiple skills may be trained with respect to music domain skills, a third portion of the portion trained with respect to multiple skills may be trained with respect to travel domain skills, etc.

Clustering may not be beneficial in every instance because it may cause the shortlister component 1050 to output indications of only a portion of the skills that the ASR output data 910 may relate to. For example, a user input may correspond to "tell me about Tom Collins." If the model is clustered based on domain, the shortlister component 1050 may determine the user input corresponds to a recipe skill (e.g., a drink recipe) even though the user input may also correspond to an information skill (e.g., including information about a person named Tom Collins).

The NLU component 760 may include one or more recognizers 1063. In at least some embodiments, a recognizer 1063 may be associated with a skill system 125 (e.g., the recognizer may be configured to interpret text data to correspond to the skill system 125). In at least some other examples, a recognizer 1063 may be associated with a domain such as smart home, video, music, weather, custom, etc. (e.g., the recognizer may be configured to interpret text data to correspond to the domain).

If the shortlister component 1050 determines ASR output data 910 is potentially associated with multiple domains, the recognizers 1063 associated with the domains may process the ASR output data 910, while recognizers 1063 not indicated in the shortlister component 1050's output may not process the ASR output data 910. The "shortlisted" recognizers 1063 may process the ASR output data 910 in parallel, in series, partially in parallel, etc. For example, if ASR output data 910 potentially relates to both a communications domain and a music domain, a recognizer associated with the communications domain may process the ASR output data 910 in parallel, or partially in parallel, with a recognizer associated with the music domain processing the ASR output data 910.

Each recognizer 1063 may include a named entity recognition (NER) component 1062. The NER component 1062 attempts to identify grammars and lexical information that may be used to construe meaning with respect to text data input therein. The NER component 1062 identifies portions of text data that correspond to a named entity associated with a domain, associated with the recognizer 1063 implementing the NER component 1062. The NER component 1062 (or other component of the NLU component 760) may also determine whether a word refers to an entity whose identity is not explicitly mentioned in the text data, for example "him," "her," "it" or other anaphora, exophora, or the like.

Each recognizer 1063, and more specifically each NER component 1062, may be associated with a particular grammar database 1076, a particular set of intents/actions 1074, and a particular personalized lexicon 1086. The grammar databases 1076, and intents/actions 1074 may be stored in an NLU storage 1073. Each gazetteer 1084 may include domain/skill-indexed lexical information associated with a particular user and/or device 110. For example, a Gazetteer A (1084a) includes skill-indexed lexical information 1086aa to 1086an. A user's music domain lexical information might include album titles, artist names, and song names, for example, whereas a user's communications domain lexical information might include the names of contacts. Since every user's music collection and contact list is presumably different. This personalized information improves later performed entity resolution.

An NER component 1062 applies grammar information 1076 and lexical information 1086 associated with a domain (associated with the recognizer 1063 implementing the NER component 1062) to determine a mention of one or more entities in text data. In this manner, the NER component 1062 identifies "slots" (each corresponding to one or more particular words in text data) that may be useful for later processing. The NER component 1062 may also label each slot with a type (e.g., noun, place, city, artist name, song name, etc.).

Each grammar database 1076 includes the names of entities (i.e., nouns) commonly found in speech about the particular domain to which the grammar database 1076 relates, whereas the lexical information 1086 is personalized to the user and/or the device 110 from which the user input originated. For example, a grammar database 1076 associated with a shopping domain may include a database of words commonly used when people discuss shopping.

A downstream process called entity resolution (discussed in detail elsewhere herein) links a slot of text data to a specific entity known to the system. To perform entity resolution, the NLU component 760 may utilize gazetteer information (1084a-1084n) stored in an entity library storage 1082. The gazetteer information 1084 may be used to match text data (representing a portion of the user input) with text data representing known entities, such as song titles, contact names, etc. Gazetteers 1084 may be linked to users (e.g., a particular gazetteer may be associated with a specific user's music collection), may be linked to certain domains (e.g., a shopping domain, a music domain, a video domain, etc.), or may be organized in a variety of other ways.

Each recognizer 1063 may also include an intent classification (IC) component 1064. An IC component 1064 parses text data to determine an intent(s) (associated with the domain associated with the recognizer 1063 implementing the IC component 1064) that potentially represents the user input. An intent represents to an action a user desires be performed. An IC component 1064 may communicate with a database 1074 of words linked to intents. For example, a music intent database may link words and phrases such as "quiet," "volume off," and "mute" to a <Mute> intent. An IC component 1064 identifies potential intents by comparing words and phrases in text data (representing at least a portion of the user input) to the words and phrases in an intents database 1074 (associated with the domain that is associated with the recognizer 1063 implementing the IC component 1064).

The intents identifiable by a specific IC component 1064 are linked to domain-specific (i.e., the domain associated with the recognizer 1063 implementing the IC component 1064) grammar frameworks 1076 with "slots" to be filled. Each slot of a grammar framework 1076 corresponds to a portion of text data that the system believes corresponds to an entity. For example, a grammar framework 1076 corresponding to a <PlayMusic> intent may correspond to text data sentence structures such as "Play {Artist Name}," "Play {Album Name}," "Play {Song name}," "Play {Song name} by {Artist Name}," etc. However, to make entity resolution more flexible, grammar frameworks 1076 may not be structured as sentences, but rather based on associating slots with grammatical tags.

For example, an NER component 1062 may parse text data to identify words as subject, object, verb, preposition, etc. based on grammar rules and/or models prior to recognizing named entities in the text data. An IC component 1064 (implemented by the same recognizer 1063 as the NER component 1062) may use the identified verb to identify an intent. The NER component 1062 may then determine a grammar model 1076 associated with the identified intent. For example, a grammar model 1076 for an intent corresponding to <PlayMusic> may specify a list of slots applicable to play the identified "object" and any object modifier (e.g., a prepositional phrase), such as {Artist Name}, {Album Name}, {Song name}, etc. The NER component 1062 may then search corresponding fields in a lexicon 1086 (associated with the domain associated with the recognizer 1063 implementing the NER component 1062), attempting to match words and phrases in text data the NER component 1062 previously tagged as a grammatical object or object modifier with those identified in the lexicon 1086.

An NER component 1062 may perform semantic tagging, which is the labeling of a word or combination of words according to their type/semantic meaning. An NER component 1062 may parse text data using heuristic grammar rules, or a model may be constructed using techniques such as Hidden Markov Models, maximum entropy models, log linear models, conditional random fields (CRF), and the like. For example, an NER component 1062 implemented by a music domain recognizer may parse and tag text data corresponding to "play mother's little helper by the rolling stones" as {Verb}: "Play," {Object}: "mother's little helper," {Object Preposition}: "by," and {Object Modifier}: "the rolling stones." The NER component 1062 identifies "Play" as a verb based on a word database associated with the music domain, which an IC component 1064 (also implemented by the music domain recognizer) may determine corresponds to a <PlayMusic> intent. At this stage, no determination has been made as to the meaning of "mother's little helper" or "the rolling stones," but based on grammar rules and models, the NER component 1062 has determined the text of these phrases relates to the grammatical object (i.e., entity) of the user input represented in the text data.

An NER component 1062 may tag text data to attribute meaning thereto. For example, an NER component 1062 may tag "play mother's little helper by the rolling stones" as: {domain} Music, {intent}<PlayMusic>, {artist name} rolling stones, {media type} SONG, and {song title} mother's little helper. For further example, the NER component 1062 may tag "play songs by the rolling stones" as: {domain} Music, {intent}<PlayMusic>, {artist name} rolling stones, and {media type} SONG.

The shortlister component 1050 may receive ASR output data 910 output from the ASR component 750 or output from the device 110b (as illustrated in FIG. 11). The ASR component 750 may embed the ASR output data 910 into a form processable by a trained model(s) using sentence embedding techniques as known in the art. Sentence embedding results in the ASR output data 910 including text in a structure that enables the trained models of the shortlister component 1050 to operate on the ASR output data 910. For example, an embedding of the ASR output data 910 may be a vector representation of the ASR output data 910.

The shortlister component 1050 may make binary determinations (e.g., yes or no) regarding which domains relate to the ASR output data 910. The shortlister component 1050 may make such determinations using the one or more trained models described herein above. If the shortlister component 1050 implements a single trained model for each domain, the shortlister component 1050 may simply run the models that are associated with enabled domains as indicated in a user profile associated with the device 110 and/or user that originated the user input.

The shortlister component 1050 may generate n-best list data 1115 representing domains that may execute with respect to the user input represented in the ASR output data 910. The size of the n-best list represented in the n-best list data 1115 is configurable. In an example, the n-best list data 1115 may indicate every domain of the system as well as contain an indication, for each domain, regarding whether the domain is likely capable to execute the user input represented in the ASR output data 910. In another example, instead of indicating every domain of the system, the n-best list data 1115 may only indicate the domains that are likely to be able to execute the user input represented in the ASR output data 910. In yet another example, the shortlister component 1050 may implement thresholding such that the n-best list data 1115 may indicate no more than a maximum number of domains that may execute the user input represented in the ASR output data 910. In an example, the threshold number of domains that may be represented in the n-best list data 1115 is ten. In another example, the domains included in the n-best list data 1115 may be limited by a threshold a score, where only domains indicating a likelihood to handle the user input is above a certain score (as determined by processing the ASR output data 910 by the shortlister component 1050 relative to such domains) are included in the n-best list data 1115.

The ASR output data 910 may correspond to more than one ASR hypothesis. When this occurs, the shortlister component 1050 may output a different n-best list (represented in the n-best list data 1115) for each ASR hypothesis. Alternatively, the shortlister component 1050 may output a single n-best list representing the domains that are related to the multiple ASR hypotheses represented in the ASR output data 910.

As indicated above, the shortlister component 1050 may implement thresholding such that an n-best list output therefrom may include no more than a threshold number of entries. If the ASR output data 910 includes more than one ASR hypothesis, the n-best list output by the shortlister component 1050 may include no more than a threshold number of entries irrespective of the number of ASR hypotheses output by the ASR component 750. Alternatively or in addition, the n-best list output by the shortlister component 1050 may include no more than a threshold number of entries for each ASR hypothesis (e.g., no more than five entries for a first ASR hypothesis, no more than five entries for a second ASR hypothesis, etc.).

In addition to making a binary determination regarding whether a domain potentially relates to the ASR output data 910, the shortlister component 1050 may generate confidence scores representing likelihoods that domains relate to the ASR output data 910. If the shortlister component 1050 implements a different trained model for each domain, the shortlister component 1050 may generate a different confidence score for each individual domain trained model that is run. If the shortlister component 1050 runs the models of every domain when ASR output data 910 is received, the shortlister component 1050 may generate a different confidence score for each domain of the system. If the shortlister component 1050 runs the models of only the domains that are associated with skills indicated as enabled in a user profile associated with the device 110 and/or user that originated the user input, the shortlister component 1050 may only generate a different confidence score for each domain associated with at least one enabled skill. If the shortlister component 1050 implements a single trained model with domain specifically trained portions, the shortlister component 1050 may generate a different confidence score for each domain who's specifically trained portion is run. The shortlister component 1050 may perform matrix vector modification to obtain confidence scores for all domains of the system in a single instance of processing of the ASR output data 910.

N-best list data 1115 including confidence scores that may be output by the shortlister component 1050 may be represented as, for example:

Search domain, 0.67
Recipe domain, 0.62
Information domain, 0.57
Shopping domain, 0.42

As indicated, the confidence scores output by the shortlister component 1050 may be numeric values. The confidence scores output by the shortlister component 1050 may alternatively be binned values (e.g., high, medium, low).

The n-best list may only include entries for domains having a confidence score satisfying (e.g., equaling or exceeding) a minimum threshold confidence score. Alternatively, the shortlister component 1050 may include entries for all domains associated with user enabled skills, even if one or more of the domains are associated with confidence scores that do not satisfy the minimum threshold confidence score.

The shortlister component 1050 may consider other data 1120 when determining which domains may relate to the user input represented in the ASR output data 910 as well as respective confidence scores. The other data 1120 may include usage history data associated with the device 110 and/or user that originated the user input. For example, a confidence score of a domain may be increased if user inputs originated by the device 110 and/or user routinely invoke the domain. Conversely, a confidence score of a domain may be decreased if user inputs originated by the device 110 and/or user rarely invoke the domain. Thus, the other data 1120 may include an indicator of the user associated with the ASR output data 910, for example as determined by the user recognition component 795.

The other data 1120 may be character embedded prior to being input to the shortlister component 1050. The other data 1120 may alternatively be embedded using other techniques known in the art prior to being input to the shortlister component 1050.

The other data 1120 may also include data indicating the domains associated with skills that are enabled with respect to the device 110 and/or user that originated the user input. The shortlister component 1050 may use such data to determine which domain-specific trained models to run. That is, the shortlister component 1050 may determine to only run the trained models associated with domains that are associated with user-enabled skills. The shortlister component 1050 may alternatively use such data to alter confidence scores of domains.

As an example, considering two domains, a first domain associated with at least one enabled skill and a second domain not associated with any user-enabled skills of the user that originated the user input, the shortlister component 1050 may run a first model specific to the first domain as well as a second model specific to the second domain. Alternatively, the shortlister component 1050 may run a model configured to determine a score for each of the first and second domains. The shortlister component 1050 may determine a same confidence score for each of the first and second domains in the first instance. The shortlister component 1050 may then alter those confidence scores based on which domains is associated with at least one skill enabled by the present user. For example, the shortlister component 1050 may increase the confidence score associated with the domain associated with at least one enabled skill while leaving the confidence score associated with the other domain the same. Alternatively, the shortlister component 1050 may leave the confidence score associated with the domain associated with at least one enabled skill the same while decreasing the confidence score associated with the other domain. Moreover, the shortlister component 1050 may increase the confidence score associated with the domain associated with at least one enabled skill as well as decrease the confidence score associated with the other domain.

As indicated, a user profile may indicate which skills a corresponding user has enabled (e.g., authorized to execute using data associated with the user). Such indications may be stored in the profile storage 770. When the shortlister component 1050 receives the ASR output data 910, the shortlister component 1050 may determine whether profile data associated with the user and/or device 110 that originated the command includes an indication of enabled skills.

The other data 1120 may also include data indicating the type of the device 110. The type of a device may indicate the output capabilities of the device. For example, a type of device may correspond to a device with a visual display, a headless (e.g., displayless) device, whether a device is mobile or stationary, whether a device includes audio playback capabilities, whether a device includes a camera, other device hardware configurations, etc. The shortlister component 1050 may use such data to determine which domain-specific trained models to run. For example, if the device 110 corresponds to a displayless type device, the shortlister component 1050 may determine not to run trained models specific to domains that output video data. The shortlister component 1050 may alternatively use such data to alter confidence scores of domains.

As an example, considering two domains, one that outputs audio data and another that outputs video data, the shortlister component 1050 may run a first model specific to the domain that generates audio data as well as a second model specific to the domain that generates video data. Alternatively the shortlister component 1050 may run a model configured to determine a score for each domain. The shortlister component 1050 may determine a same confidence score for each of the domains in the first instance. The shortlister component 1050 may then alter the original confidence scores based on the type of the device 110 that originated the user input corresponding to the ASR output data 910. For example, if the device 110 is a displayless device, the shortlister component 1050 may increase the confidence score associated with the domain that generates audio data while leaving the confidence score associated with the domain that generates video data the same. Alternatively, if the device 110 is a displayless device, the shortlister component 1050 may leave the confidence score associated with the domain that generates audio data the same while decreasing the confidence score associated with the domain that generates video data. Moreover, if the device 110 is a displayless device, the shortlister component 1050 may increase the confidence score associated with the domain that generates audio data as well as decrease the confidence score associated with the domain that generates video data.

The type of device information represented in the other data 1120 may represent output capabilities of the device to be used to output content to the user, which may not necessarily be the user input originating device. For example, a user may input a spoken user input corresponding to "play Game of Thrones" to a device not including a display. The system may determine a smart TV or other display device (associated with the same user profile) for outputting Game of Thrones. Thus, the other data 1120 may represent the smart TV of other display device, and not the displayless device that captured the spoken user input.

The other data 1120 may also include data indicating the user input originating device's speed, location, or other mobility information. For example, the device may correspond to a vehicle including a display. If the vehicle is moving, the shortlister component 1050 may decrease the confidence score associated with a domain that generates video data as it may be undesirable to output video content to a user while the user is driving. The device may output data to the system(s) 120 indicating when the device is moving.

The other data 1120 may also include data indicating a currently invoked domain. For example, a user may speak a first (e.g., a previous) user input causing the system to invoke a music domain skill to output music to the user. As the system is outputting music to the user, the system may receive a second (e.g., the current) user input. The shortlister component 1050 may use such data to alter confidence scores of domains. For example, the shortlister component 1050 may run a first model specific to a first domain as well as a second model specific to a second domain. Alternatively, the shortlister component 1050 may run a model configured to determine a score for each domain. The shortlister component 1050 may also determine a same confidence score for each of the domains in the first instance. The shortlister component 1050 may then alter the original confidence scores based on the first domain being invoked to cause the system to output content while the current user input was received. Based on the first domain being invoked, the shortlister component 1050 may (i) increase the confidence score associated with the first domain while leaving the confidence score associated with the second domain the same, (ii) leave the confidence score associated with the first domain the same while decreasing the confidence score associated with the second domain, or (iii) increase the confidence score associated with the first domain as well as decrease the confidence score associated with the second domain.

The thresholding implemented with respect to the n-best list data 1115 generated by the shortlister component 1050 as well as the different types of other data 1120 considered by the shortlister component 1050 are configurable. For example, the shortlister component 1050 may update confidence scores as more other data 1120 is considered. For further example, the n-best list data 1115 may exclude relevant domains if thresholding is implemented. Thus, for example, the shortlister component 1050 may include an indication of a domain in the n-best list 1115 unless the shortlister component 1050 is one hundred percent confident that the domain may not execute the user input represented in the ASR output data 910 (e.g., the shortlister component 1050 determines a confidence score of zero for the domain).

The shortlister component 1050 may send the ASR output data 910 to recognizers 1063 associated with domains represented in the n-best list data 1115. Alternatively, the shortlister component 1050 may send the n-best list data 1115 or some other indicator of the selected subset of domains to another component (such as the orchestrator component 730) which may in turn send the ASR output data 910 to the recognizers 1063 corresponding to the domains included in the n-best list data 1115 or otherwise indicated in the indicator. If the shortlister component 1050 generates an n-best list representing domains without any associated confidence scores, the shortlister component 1050/orchestrator component 730 may send the ASR output data 910 to recognizers 1063 associated with domains that the shortlister component 1050 determines may execute the user input. If the shortlister component 1050 generates an n-best list representing domains with associated confidence scores, the shortlister component 1050/orchestrator component 730 may send the ASR output data 910 to recognizers 1063 associated with domains associated with confidence scores satisfying (e.g., meeting or exceeding) a threshold minimum confidence score.

A recognizer 1063 may output tagged text data generated by an NER component 1062 and an IC component 1064, as described herein above. The NLU component 760 may compile the output tagged text data of the recognizers 1063 into a single cross-domain n-best list 1140 and may send the cross-domain n-best list 1140 to a pruning component 1150. Each entry of tagged text (e.g., each NLU hypothesis) represented in the cross-domain n-best list data 1140 may be associated with a respective score indicating a likelihood that the NLU hypothesis corresponds to the domain associated with the recognizer 1063 from which the NLU hypothesis was output. For example, the cross-domain n-best list data 1140 may be represented as (with each line corresponding to a different NLU hypothesis):

[0.95] Intent: <PlayMusic> ArtistName: Beethoven SongName: Waldstein Sonata

[0.70] Intent: <Play Video> ArtistName: Beethoven VideoName: Waldstein Sonata

[0.01] Intent: <PlayMusic> ArtistName: Beethoven AlbumName: Waldstein Sonata

[0.01] Intent: <PlayMusic> SongName: Waldstein Sonata

The pruning component 1150 may sort the NLU hypotheses represented in the cross-domain n-best list data 1140 according to their respective scores. The pruning component 1150 may perform score thresholding with respect to the cross-domain NLU hypotheses. For example, the pruning component 1150 may select NLU hypotheses associated with scores satisfying (e.g., meeting and/or exceeding) a threshold score. The pruning component 1150 may also or alternatively perform number of NLU hypothesis thresholding. For example, the pruning component 1150 may select the top scoring NLU hypothesis(es). The pruning component 1150 may output a portion of the NLU hypotheses input thereto. The purpose of the pruning component 1150 is to create a reduced list of NLU hypotheses so that downstream, more resource intensive, processes may only operate on the NLU hypotheses that most likely represent the user's intent.

The NLU component 760 may include a light slot filler component 1152. The light slot filler component 1152 can take text from slots represented in the NLU hypotheses output by the pruning component 1150 and alter them to make the text more easily processed by downstream components. The light slot filler component 1152 may perform low latency operations that do not involve heavy operations such as reference to a knowledge base (e.g., 1072. The purpose of the light slot filler component 1152 is to replace words with other words or values that may be more easily understood by downstream components. For example, if a NLU hypothesis includes the word "tomorrow," the light slot filler component 1152 may replace the word "tomorrow" with an actual date for purposes of downstream processing. Similarly, the light slot filler component 1152 may replace the word "CD" with "album" or the words "compact disc." The replaced words are then included in the cross-domain n-best list data 1160.

The cross-domain n-best list data 1160 may be input to an entity resolution component 1170. The entity resolution component 1170 can apply rules or other instructions to standardize labels or tokens from previous stages into an intent/slot representation. The precise transformation may depend on the domain. For example, for a travel domain, the entity resolution component 1170 may transform text corresponding to "Boston airport" to the standard BOS three-letter code referring to the airport. The entity resolution component 1170 can refer to a knowledge base (e.g., 1072) that is used to specifically identify the precise entity referred to in each slot of each NLU hypothesis represented in the cross-domain n-best list data 1160. Specific intent/slot combinations may also be tied to a particular source, which may then be used to resolve the text. In the example "play songs by the stones," the entity resolution component 1170 may reference a personal music catalog, Amazon Music account, a user profile, or the like. The entity resolution component 1170 may output an altered n-best list that is based on the cross-domain n-best list 1160 but that includes more detailed information (e.g., entity IDs) about the specific entities mentioned in the slots and/or more detailed slot data that can eventually be used by a skill. The NLU component 760 may include multiple entity resolution components 1170 and each entity resolution component 1170 may be specific to one or more domains.

The NLU component 760 may include a reranker 1190. The reranker 1190 may assign a particular confidence score to each NLU hypothesis input therein. The confidence score of a particular NLU hypothesis may be affected by whether the NLU hypothesis has unfilled slots. For example, if a NLU hypothesis includes slots that are all filled/resolved, that NLU hypothesis may be assigned a higher confidence score than another NLU hypothesis including at least some slots that are unfilled/unresolved by the entity resolution component 1170.

The reranker 1190 may apply re-scoring, biasing, or other techniques. The reranker 1190 may consider not only the data output by the entity resolution component 1170, but may also consider other data 1191. The other data 1191 may include a variety of information. For example, the other data 1191 may include skill rating or popularity data. For example, if one skill has a high rating, the reranker 1190 may increase the score of a NLU hypothesis that may be processed by the skill. The other data 1191 may also include information about skills that have been enabled by the user that originated the user input. For example, the reranker 1190 may assign higher scores to NLU hypothesis that may be processed by enabled skills than NLU hypothesis that may be processed by non-enabled skills. The other data 1191 may also include data indicating user usage history, such as if the user that originated the user input regularly uses a particular skill or does so at particular times of day. The other data 1191 may additionally include data indicating date, time, location, weather, type of device 110, user identifier, context, as well as other information. For example, the reranker 1190 may consider when any particular skill is currently active (e.g., music being played, a game being played, etc.).

As illustrated and described, the entity resolution component 1170 is implemented prior to the reranker 1190. The entity resolution component 1170 may alternatively be implemented after the reranker 1190. Implementing the entity resolution component 1170 after the reranker 1190 limits the NLU hypotheses processed by the entity resolution component 1170 to only those hypotheses that successfully pass through the reranker 1190.

The reranker 1190 may be a global reranker (e.g., one that is not specific to any particular domain). Alternatively, the NLU component 760 may implement one or more domain-specific rerankers. Each domain-specific reranker may rerank NLU hypotheses associated with the domain. Each domain-specific reranker may output an n-best list of reranked hypotheses (e.g., 5-10 hypotheses).

The NLU component 760 may perform NLU processing described above with respect to domains associated with skills wholly implemented as part of the system(s) 120 (e.g., designated 790 in FIG. 7). The NLU component 760 may separately perform NLU processing described above with respect to domains associated with skills that are at least partially implemented as part of the skill system(s) 125. In an example, the shortlister component 1050 may only process with respect to these latter domains. Results of these two NLU processing paths may be merged into NLU output data 1185, which may be sent to a post-NLU ranker 765, which may be implemented by the system(s) 120.

The post-NLU ranker 765 may include a statistical component that produces a ranked list of intent/skill pairs with associated confidence scores. Each confidence score may indicate an adequacy of the skill's execution of the intent with respect to NLU results data associated with the skill. The post-NLU ranker 765 may operate one or more trained models configured to process the NLU results data 1185, skill result data 1130, and the other data 1120 in order to output ranked output data 1125. The ranked output data 1125 may include an n-best list where the NLU hypotheses in the NLU results data 1185 are reordered such that the n-best list in the ranked output data 1125 represents a prioritized list of skills to respond to a user input as determined by the post-NLU ranker 765. The ranked output data 1125 may also include (either as part of an n-best list or otherwise) individual respective scores corresponding to skills where each score indicates a probability that the skill (and/or its respective result data) corresponds to the user input.

The system may be configured with thousands, tens of thousands, etc. skills. The post-NLU ranker 765 enables the system to better determine the best skill to execute the user input. For example, first and second NLU hypotheses in the NLU results data 1185 may substantially correspond to each other (e.g., their scores may be significantly similar), even though the first NLU hypothesis may be processed by a first skill and the second NLU hypothesis may be processed by a second skill. The first NLU hypothesis may be associated with a first confidence score indicating the system's confidence with respect to NLU processing performed to generate the first NLU hypothesis. Moreover, the second NLU hypothesis may be associated with a second confidence score indicating the system's confidence with respect to NLU processing performed to generate the second NLU hypothesis. The first confidence score may be similar or identical to the second confidence score. The first confidence score and/or the second confidence score may be a numeric value (e.g., from 0.0 to 1.0). Alternatively, the first confidence score and/or the second confidence score may be a binned value (e.g., low, medium, high).

The post-NLU ranker 765 (or other scheduling component such as orchestrator component 730) may solicit the first skill and the second skill to provide potential result data 1130 based on the first NLU hypothesis and the second NLU hypothesis, respectively. For example, the post-NLU ranker 765 may send the first NLU hypothesis to the first skill 790a along with a request for the first skill 790a to at least partially execute with respect to the first NLU hypothesis. The post-NLU ranker 765 may also send the second NLU hypothesis to the second skill 790b along with a request for the second skill 790b to at least partially execute with respect to the second NLU hypothesis. The post-NLU ranker 765 receives, from the first skill 790a, first result data 1130a generated from the first skill 790a's execution with respect to the first NLU hypothesis. The post-NLU ranker 765 also receives, from the second skill 790b, second results data 1130b generated from the second skill 790b's execution with respect to the second NLU hypothesis.

The result data 1130 may include various portions. For example, the result data 1130 may include content (e.g., audio data, text data, and/or video data) to be output to a user. The result data 1130 may also include a unique identifier used by the system(s) 120 and/or the skill system(s) 125 to locate the data to be output to a user. The result data 1130 may also include an instruction. For example, if the user input corresponds to "turn on the light," the result data 1130 may include an instruction causing the system to turn on a light associated with a profile of the device (110a/110b) and/or user.

The post-NLU ranker 765 may consider the first result data 1130a and the second result data 1130b to alter the first confidence score and the second confidence score of the first NLU hypothesis and the second NLU hypothesis, respectively. That is, the post-NLU ranker 765 may generate a third confidence score based on the first result data 1130a and the first confidence score. The third confidence score may correspond to how likely the post-NLU ranker 765 determines the first skill will correctly respond to the user input. The post-NLU ranker 765 may also generate a fourth confidence score based on the second result data 1130b and the second confidence score. One skilled in the art will appreciate that a first difference between the third confidence score and the fourth confidence score may be greater than a second difference between the first confidence score and the second confidence score. The post-NLU ranker 765 may also consider the other data 1120 to generate the third confidence score and the fourth confidence score. While it has been described that the post-NLU ranker 765 may alter the confidence scores associated with first and second NLU hypotheses, one skilled in the art will appreciate that the post-NLU ranker 765 may alter the confidence scores of more than two NLU hypotheses. The post-NLU ranker 765 may select the result data 1130 associated with the skill 790 with the highest altered confidence score to be the data output in response to the current user input. The post-NLU ranker 765 may also consider the ASR output data 910 to alter the NLU hypotheses confidence scores.

The orchestrator component 730 may, prior to sending the NLU results data 1185 to the post-NLU ranker 765, associate intents in the NLU hypotheses with skills 790. For example, if a NLU hypothesis includes a <PlayMusic> intent, the orchestrator component 730 may associate the NLU hypothesis with one or more skills 790 that can execute the <PlayMusic> intent. Thus, the orchestrator component 730 may send the NLU results data 1185, including NLU hypotheses paired with skills 790, to the post-NLU ranker 765. In response to ASR output data 910 corresponding to "what should I do for dinner today," the orchestrator component 730 may generates pairs of skills 790 with associated NLU hypotheses corresponding to:

Skill 1/NLU hypothesis including <Help> intent
Skill 2/NLU hypothesis including <Order> intent
Skill 3/NLU hypothesis including <DishType> intent The post-NLU ranker 765 queries each skill 790, paired with a NLU hypothesis in the NLU output data 1185, to provide result data 1130 based on the NLU hypothesis with which it is associated. That is, with respect to each skill, the post-NLU ranker 765 colloquially asks the each skill "if given this NLU hypothesis, what would you do with it." According to the above example, the post-NLU ranker 765 may send skills 790 the following data:

Skill 1: First NLU hypothesis including <Help> intent indicator
Skill 2: Second NLU hypothesis including <Order> intent indicator
Skill 3: Third NLU hypothesis including <DishType> intent indicator The post-NLU ranker 765 may query each of the skills 790 in parallel or substantially in parallel.

A skill 790 may provide the post-NLU ranker 765 with various data and indications in response to the post-NLU ranker 765 soliciting the skill 790 for result data 1130. A skill 790 may simply provide the post-NLU ranker 765 with an indication of whether or not the skill can execute with respect to the NLU hypothesis it received. A skill 790 may also or alternatively provide the post-NLU ranker 765 with output data generated based on the NLU hypothesis it received. In some situations, a skill 790 may need further information in addition to what is represented in the received NLU hypothesis to provide output data responsive to the user input. In these situations, the skill 790 may provide the post-NLU ranker 765 with result data 1130 indicating slots of a framework that the skill 790 further needs filled or entities that the skill 790 further needs resolved prior to the skill 790 being able to provided result data 1130 responsive to the user input. The skill 790 may also provide the post-NLU ranker 765 with an instruction and/or computer-generated speech indicating how the skill 790 recommends the system solicit further information needed by the skill 790. The skill 790 may further provide the post-NLU ranker 765 with an indication of whether the skill 790 will have all needed information after the user provides additional information a single time, or whether the skill 790 will need the user to provide various kinds of additional information prior to the skill 790 having all needed information. According to the above example, skills 790 may provide the post-NLU ranker 765 with the following:

Skill 1: indication representing the skill can execute with respect to a NLU hypothesis including the <Help> intent indicator Skill 2: indication representing the skill needs to the system to obtain further information Skill 3: indication representing the skill can provide numerous results in response to the third NLU hypothesis including the <DishType> intent indicator Result data 1130 includes an indication provided by a skill 790 indicating whether or not the skill 790 can execute with respect to a NLU hypothesis; data generated by a skill 790 based on a NLU hypothesis; as well as an indication provided by a skill 790 indicating the skill 790 needs further information in addition to what is represented in the received NLU hypothesis.

The post-NLU ranker 765 uses the result data 1130 provided by the skills 790 to alter the NLU processing confidence scores generated by the reranker 1190. That is, the post-NLU ranker 765 uses the result data 1130 provided by the queried skills 790 to create larger differences between the NLU processing confidence scores generated by the reranker 1190. Without the post-NLU ranker 765, the system may not be confident enough to determine an output in response to a user input, for example when the NLU hypotheses associated with multiple skills are too close for the system to confidently determine a single skill 790 to invoke to respond to the user input. For example, if the system does not implement the post-NLU ranker 765, the system may not be able to determine whether to obtain output data from a general reference information skill or a medical information skill in response to a user input corresponding to "what is acne."

The post-NLU ranker 765 may prefer skills 790 that provide result data 1130 responsive to NLU hypotheses over skills 790 that provide result data 1130 corresponding to an indication that further information is needed, as well as skills 790 that provide result data 1130 indicating they can provide multiple responses to received NLU hypotheses. For example, the post-NLU ranker 765 may generate a first score for a first skill 790a that is greater than the first skill's NLU confidence score based on the first skill 790a providing result data 1130a including a response to a NLU hypothesis. For further example, the post-NLU ranker 765 may generate a second score for a second skill 790b that is less than the second skill's NLU confidence score based on the second skill 790b providing result data 1130b indicating further information is needed for the second skill 790b to provide a response to a NLU hypothesis. Yet further, for example, the post-NLU ranker 765 may generate a third score for a third skill 790c that is less than the third skill's NLU confidence score based on the third skill 790c providing result data 1130c indicating the third skill 790c can provide multiple responses to a NLU hypothesis.

The post-NLU ranker 765 may consider other data 1120 in determining scores. The other data 1120 may include rankings associated with the queried skills 790. A ranking may be a system ranking or a user-specific ranking. A ranking may indicate a veracity of a skill from the perspective of one or more users of the system. For example, the post-NLU ranker 765 may generate a first score for a first skill 790a that is greater than the first skill's NLU processing confidence score based on the first skill 790a being associated with a high ranking. For further example, the post-NLU ranker 765 may generate a second score for a second skill 790b that is less than the second skill's NLU processing confidence score based on the second skill 790b being associated with a low ranking.

The other data 1120 may include information indicating whether or not the user that originated the user input has enabled one or more of the queried skills 790. For example, the post-NLU ranker 765 may generate a first score for a first skill 790a that is greater than the first skill's NLU processing confidence score based on the first skill 790a being enabled by the user that originated the user input. For further example, the post-NLU ranker 765 may generate a second score for a second skill 790b that is less than the second skill's NLU processing confidence score based on the second skill 790b not being enabled by the user that originated the user input. When the post-NLU ranker 765 receives the NLU results data 1185, the post-NLU ranker 765 may determine whether profile data, associated with the user and/or device that originated the user input, includes indications of enabled skills.

The other data 1120 may include information indicating output capabilities of a device that will be used to output content, responsive to the user input, to the user. The system may include devices that include speakers but not displays, devices that include displays but not speakers, and devices that include speakers and displays. If the device that will output content responsive to the user input includes one or more speakers but not a display, the post-NLU ranker 765 may increase the NLU processing confidence score associated with a first skill configured to output audio data and/or decrease the NLU processing confidence score associated with a second skill configured to output visual data (e.g., image data and/or video data). If the device that will output content responsive to the user input includes a display but not one or more speakers, the post-NLU ranker 765 may increase the NLU processing confidence score associated with a first skill configured to output visual data and/or decrease the NLU processing confidence score associated with a second skill configured to output audio data.

The other data 1120 may include information indicating the veracity of the result data 1130 provided by a skill 790. For example, if a user says "tell me a recipe for pasta sauce," a first skill 790a may provide the post-NLU ranker 765 with first result data 1130a corresponding to a first recipe associated with a five star rating and a second skill 790b may provide the post-NLU ranker 765 with second result data 1130b corresponding to a second recipe associated with a one star rating. In this situation, the post-NLU ranker 765 may increase the NLU processing confidence score associated with the first skill 790a based on the first skill 790a providing the first result data 1130a associated with the five star rating and/or decrease the NLU processing confidence score associated with the second skill 790b based on the second skill 790b providing the second result data 1130b associated with the one star rating.

The other data 1120 may include information indicating the type of device that originated the user input. For example, the device may correspond to a "hotel room" type if the device is located in a hotel room. If a user inputs a command corresponding to "order me food" to the device located in the hotel room, the post-NLU ranker 765 may increase the NLU processing confidence score associated with a first skill 790a corresponding to a room service skill associated with the hotel and/or decrease the NLU processing confidence score associated with a second skill 790b corresponding to a food skill not associated with the hotel.

The other data 1120 may include information indicating a location of the device and/or user that originated the user input. The system may be configured with skills 790 that may only operate with respect to certain geographic locations. For example, a user may provide a user input corresponding to "when is the next train to Portland." A first skill 790a may operate with respect to trains that arrive at, depart from, and pass through Portland, Oregon. A second skill 790b may operate with respect to trains that arrive at, depart from, and pass through Portland, Maine. If the device and/or user that originated the user input is located in Seattle, Washington, the post-NLU ranker 765 may increase the NLU processing confidence score associated with the first skill 790a and/or decrease the NLU processing confidence score associated with the second skill 790b. Likewise, if the device and/or user that originated the user input is located in Boston, Massachusetts, the post-NLU ranker 765 may increase the NLU processing confidence score associated with the second skill 790b and/or decrease the NLU processing confidence score associated with the first skill 790a.

The other data 1120 may include information indicating a time of day. The system may be configured with skills 790 that operate with respect to certain times of day. For example, a user may provide a user input corresponding to "order me food." A first skill 790a may generate first result data 1130a corresponding to breakfast. A second skill 790b may generate second result data 1130b corresponding to dinner. If the system(s) 120 receives the user input in the morning, the post-NLU ranker 765 may increase the NLU processing confidence score associated with the first skill 790a and/or decrease the NLU processing score associated with the second skill 790b. If the system(s) 120 receives the user input in the afternoon or evening, the post-NLU ranker 765 may increase the NLU processing confidence score associated with the second skill 790b and/or decrease the NLU processing confidence score associated with the first skill 790a.

The other data 1120 may include information indicating user preferences. The system may include multiple skills 790 configured to execute in substantially the same manner. For example, a first skill 790a and a second skill 790b may both be configured to order food from respective restaurants. The system may store a user preference (e.g., in the profile storage 770) that is associated with the user that provided the user input to the system(s) 120 as well as indicates the user prefers the first skill 790a over the second skill 790b. Thus, when the user provides a user input that may be executed by both the first skill 790a and the second skill 790b, the post-NLU ranker 765 may increase the NLU processing confidence score associated with the first skill 790a and/or decrease the NLU processing confidence score associated with the second skill 790b.

The other data 1120 may include information indicating system usage history associated with the user that originated the user input. For example, the system usage history may indicate the user originates user inputs that invoke a first skill 790a more often than the user originates user inputs that invoke a second skill 790b. Based on this, if the present user input may be executed by both the first skill 790a and the second skill 790b, the post-NLU ranker 765 may increase the NLU processing confidence score associated with the first skill 790a and/or decrease the NLU processing confidence score associated with the second skill 790b.

The other data 1120 may include information indicating a speed at which the device 110 that originated the user input is traveling. For example, the device 110 may be located in a moving vehicle, or may be a moving vehicle. When a device 110 is in motion, the system may prefer audio outputs rather than visual outputs to decrease the likelihood of distracting the user (e.g., a driver of a vehicle). Thus, for example, if the device 110 that originated the user input is moving at or above a threshold speed (e.g., a speed above an average user's walking speed), the post-NLU ranker 765 may increase the NLU processing confidence score associated with a first skill 790a that generates audio data. The post-NLU ranker 765 may also or alternatively decrease the NLU processing confidence score associated with a second skill 790b that generates image data or video data.

The other data 1120 may include information indicating how long it took a skill 790 to provide result data 1130 to the post-NLU ranker 765. When the post-NLU ranker 765 multiple skills 790 for result data 1130, the skills 790 may respond to the queries at different speeds. The post-NLU ranker 765 may implement a latency budget. For example, if the post-NLU ranker 765 determines a skill 790 responds to the post-NLU ranker 765 within a threshold amount of time from receiving a query from the post-NLU ranker 765, the post-NLU ranker 765 may increase the NLU processing confidence score associated with the skill 790. Conversely, if the post-NLU ranker 765 determines a skill 790 does not respond to the post-NLU ranker 765 within a threshold amount of time from receiving a query from the post-NLU ranker 765, the post-NLU ranker 765 may decrease the NLU processing confidence score associated with the skill 790.

It has been described that the post-NLU ranker 765 uses the other data 1120 to increase and decrease NLU processing confidence scores associated with various skills 790 that the post-NLU ranker 765 has already requested result data from. Alternatively, the post-NLU ranker 765 may use the other data 1120 to determine which skills 790 to request result data from. For example, the post-NLU ranker 765 may use the other data 1120 to increase and/or decrease NLU processing confidence scores associated with skills 790 associated with the NLU results data 1185 output by the NLU component 760. The post-NLU ranker 765 may select n-number of top scoring altered NLU processing confidence scores. The post-NLU ranker 765 may then request result data 1130 from only the skills 790 associated with the selected n-number of NLU processing confidence scores.

As described, the post-NLU ranker 765 may request result data 1130 from all skills 790 associated with the NLU results data 1185 output by the NLU component 760. Alternatively, the system(s) 120 may prefer result data 1130 from skills implemented entirely by the system(s) 120 rather than skills at least partially implemented by the skill system(s) 125. Therefore, in the first instance, the post-NLU ranker 765 may request result data 1130 from only skills associated with the NLU results data 1185 and entirely implemented by the system(s) 120. The post-NLU ranker 765 may only request result data 1130 from skills associated with the NLU results data 1185, and at least partially implemented by the skill system(s) 125, if none of the skills, wholly implemented by the system(s) 120, provide the post-NLU ranker 765 with result data 1130 indicating either data response to the NLU results data 1185, an indication that the skill can execute the user input, or an indication that further information is needed.

As indicated above, the post-NLU ranker 765 may request result data 1130 from multiple skills 790. If one of the skills 790 provides result data 1130 indicating a response to a NLU hypothesis and the other skills provide result data 1130 indicating either they cannot execute or they need further information, the post-NLU ranker 765 may select the result data 1130 including the response to the NLU hypothesis as the data to be output to the user. If more than one of the skills 790 provides result data 1130 indicating responses to NLU hypotheses, the post-NLU ranker 765 may consider the other data 1120 to generate altered NLU processing confidence scores, and select the result data 1130 of the skill associated with the greatest score as the data to be output to the user.

A system that does not implement the post-NLU ranker 765 may select the highest scored NLU hypothesis in the NLU results data 1185. The system may send the NLU hypothesis to a skill 790 associated therewith along with a request for output data. In some situations, the skill 790 may not be able to provide the system with output data. This results in the system indicating to the user that the user input could not be processed even though another skill associated with lower ranked NLU hypothesis could have provided output data responsive to the user input.

The post-NLU ranker 765 reduces instances of the aforementioned situation. As described, the post-NLU ranker 765 queries multiple skills associated with the NLU results data 1185 to provide result data 1130 to the post-NLU ranker 765 prior to the post-NLU ranker 765 ultimately determining the skill 790 to be invoked to respond to the user input. Some of the skills 790 may provide result data 1130 indicating responses to NLU hypotheses while other skills 790 may providing result data 1130 indicating the skills cannot provide responsive data. Whereas a system not implementing the post-NLU ranker 765 may select one of the skills 790 that could not provide a response, the post-NLU ranker 765 only selects a skill 790 that provides the post-NLU ranker 765 with result data corresponding to a response, indicating further information is needed, or indicating multiple responses can be generated.

The post-NLU ranker 765 may select result data 1130, associated with the skill 790 associated with the highest score, for output to the user. Alternatively, the post-NLU ranker 765 may output ranked output data 1125 indicating skills 790 and their respective post-NLU ranker rankings. Since the post-NLU ranker 765 receives result data 1130, potentially corresponding to a response to the user input, from the skills 790 prior to post-NLU ranker 765 selecting one of the skills or outputting the ranked output data 1125, little to no latency occurs from the time skills provide result data 1130 and the time the system outputs responds to the user.

If the post-NLU ranker 765 selects result audio data to be output to a user and the system determines content should be output audibly, the post-NLU ranker 765 (or another component of the system(s) 120) may cause the device 110a and/or the device 110b to output audio corresponding to the result audio data. If the post-NLU ranker 765 selects result text data to output to a user and the system determines content should be output visually, the post-NLU ranker 765 (or another component of the system(s) 120) may cause the device 110b to display text corresponding to the result text data. If the post-NLU ranker 765 selects result audio data to output to a user and the system determines content should be output visually, the post-NLU ranker 765 (or another component of the system(s) 120) may send the result audio data to the ASR component 750. The ASR component 750 may generate output text data corresponding to the result audio data. The system(s) 120 may then cause the device 110b to display text corresponding to the output text data. If the post-NLU ranker 765 selects result text data to output to a user and the system determines content should be output audibly, the post-NLU ranker 765 (or another component of the system(s) 120) may send the result text data to the TTS component 780. The TTS component 780 may generate output audio data (corresponding to computer-generated speech) based on the result text data. The system(s) 120 may then cause the device 110a and/or the device 110b to output audio corresponding to the output audio data.

As described, a skill 790 may provide result data 1130 either indicating a response to the user input, indicating more information is needed for the skill 790 to provide a response to the user input, or indicating the skill 790 cannot provide a response to the user input. If the skill 790 associated with the highest post-NLU ranker score provides the post-NLU ranker 765 with result data 1130 indicating a response to the user input, the post-NLU ranker 765 (or another component of the system(s) 120, such as the orchestrator component 730) may simply cause content corresponding to the result data 1130 to be output to the user. For example, the post-NLU ranker 765 may send the result data 1130 to the orchestrator component 730. The orchestrator component 730 may cause the result data 1130 to be sent to the device (110a/110b), which may output audio and/or display text corresponding to the result data 1130. The orchestrator component 730 may send the result data 1130 to the ASR component 750 to generate output text data and/or may send the result data 1130 to the TTS component 780 to generate output audio data, depending on the situation.

The skill 790 associated with the highest post-NLU ranker score may provide the post-NLU ranker 765 with result data 1130 indicating more information is needed as well as instruction data. The instruction data may indicate how the skill 790 recommends the system obtain the needed information. For example, the instruction data may correspond to text data or audio data (i.e., computer-generated speech) corresponding to "please indicate" The instruction data may be in a format (e.g., text data or audio data) capable of being output by the device (110a/110b). When this occurs, the post-NLU ranker 765 may simply cause the received instruction data be output by the device (110a/110b). Alternatively, the instruction data may be in a format that is not capable of being output by the device (110a/110b). When this occurs, the post-NLU ranker 765 may cause the ASR component 750 or the TTS component 780 to process the instruction data, depending on the situation, to generate instruction data that may be output by the device (110a/110b). Once the user provides the system with all further information needed by the skill 790, the skill 790 may provide the system with result data 1130 indicating a response to the user input, which may be output by the system as detailed above.

The system may include "informational" skills 790 that simply provide the system with information, which the system outputs to the user. The system may also include "transactional" skills 790 that require a system instruction to execute the user input. Transactional skills 790 include ride sharing skills, flight booking skills, etc. A transactional skill 790 may simply provide the post-NLU ranker 765 with result data 1130 indicating the transactional skill 790 can execute the user input. The post-NLU ranker 765 may then cause the system to solicit the user for an indication that the system is permitted to cause the transactional skill 790 to execute the user input. The user-provided indication may be an audible indication or a tactile indication (e.g., activation of a virtual button or input of text via a virtual keyboard). In response to receiving the user-provided indication, the system may provide the transactional skill 790 with data corresponding to the indication. In response, the transactional skill 790 may execute the command (e.g., book a flight, book a train ticket, etc.). Thus, while the system may not further engage an informational skill 790 after the informational skill 790 provides the post-NLU ranker 765 with result data 1130, the system may further engage a transactional skill 790 after the transactional skill 790 provides the post-NLU ranker 765 with result data 1130 indicating the transactional skill 790 may execute the user input.

In some instances, the post-NLU ranker 765 may generate respective scores for first and second skills that are too close (e.g., are not different by at least a threshold difference) for the post-NLU ranker 765 to make a confident determination regarding which skill should execute the user input. When this occurs, the system may request the user indicate which skill the user prefers to execute the user input. The system may output TTS-generated speech to the user to solicit which skill the user wants to execute the user input.

Figure 12:
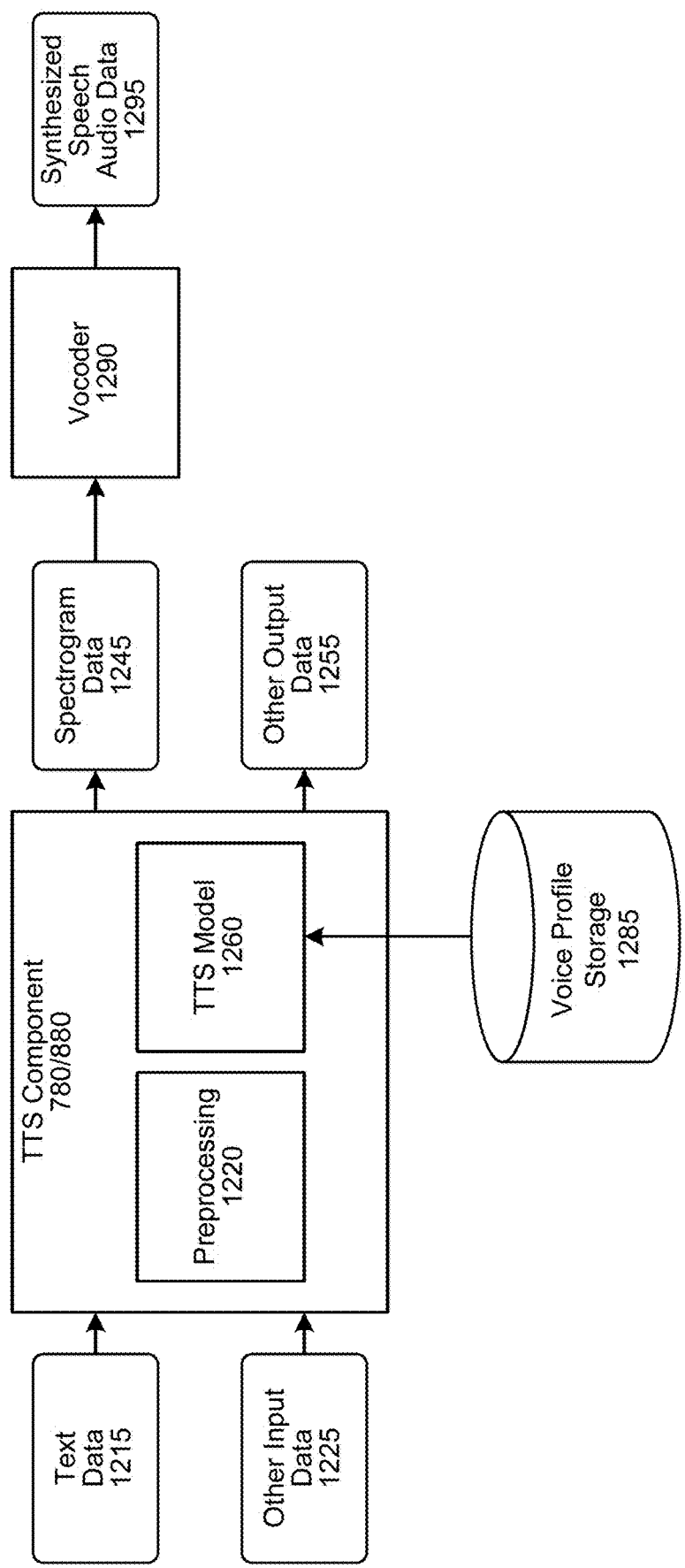
FIG. 12 is a conceptual diagram of text-to-speech components according to embodiments of the present disclosure.

Components of a system that may be used to perform unit selection, parametric TTS processing, and/or model-based audio synthesis are shown in FIG. 12. FIG. 12 is a conceptual diagram that illustrates operations for generating synthesized speech using a TTS component 780/880, according to embodiments of the present disclosure. The TTS component 780/880 may receive text data 1215 and process it using one or more TTS models 1260 to generate synthesized speech in the form of spectrogram data 1245. A vocoder 1290 may convert the spectrogram data 1245 into output speech audio data 1295, which may represent a time-domain waveform suitable for amplification and output as audio (e.g., from a loudspeaker).

The TTS component 780/880 may additionally receive other input data 1225. The other input data 1225 may include, for example, identifiers and/or labels corresponding to a desired speaker identity, voice characteristics, emotion, speech style, etc. desired for the synthesized speech. In some implementations, the other input data 1225 may include text tags or text metadata, that may indicate, for example, how specific words should be pronounced, for example by indicating the desired output speech quality in tags formatted according to the speech synthesis markup language (SSML) or in some other form. For example, a first text tag may be included with text marking the beginning of when text should be whispered (e.g., <begin whisper>) and a second tag may be included with text marking the end of when text should be whispered (e.g., <end whisper>). The tags may be included in the text data 1215 and/or the other input data 1225 such as metadata accompanying a TTS request and indicating what text should be whispered (or have some other indicated audio characteristic).

The TTS component 780/880 may include a preprocessing component 1220 that can convert the text data 1215 and/or other input data 1225 into a form suitable for processing by the TTS model 1260. The text data 1215 may be from, for example an application, a skill component (described further below), an NLG component, another device or source, or may be input by a user. The text data 1215 received by the TTS component 780/880 may not necessarily be text, but may include other data (such as symbols, code, other data, etc.) that may reference text (such as an indicator of a word and/or phoneme) that is to be synthesized. The preprocessing component 1220 may transform the text data 1215 into, for example, a symbolic linguistic representation, which may include linguistic context features such as phoneme data, punctuation data, syllable-level features, word-level features, and/or emotion, speaker, accent, or other features for processing by the TTS component 780/880. The syllable-level features may include syllable emphasis, syllable speech rate, syllable inflection, or other such syllable-level features; the word-level features may include word emphasis, word speech rate, word inflection, or other such word-level features. The emotion features may include data corresponding to an emotion associated with the text data 1215, such as surprise, anger, or fear. The speaker features may include data corresponding to a type of speaker, such as sex, age, or profession. The accent features may include data corresponding to an accent associated with the speaker, such as Southern, Boston, English, French, or other such accent. Style features may include a book reading style, poem reading style, a news anchor style, a sports commentator style, various singing styles, etc.

The preprocessing component 1220 may include functionality and/or components for performing text normalization, linguistic analysis, linguistic prosody generation, or other such operations. During text normalization, the preprocessing component 1220 may first process the text data 1215 and generate standard text, converting such things as numbers, abbreviations (such as Apt., St., etc.), symbols ($, %, etc.) into the equivalent of written out words.

During linguistic analysis, the preprocessing component 1220 may analyze the language in the normalized text to generate a sequence of phonetic units corresponding to the input text. This process may be referred to as grapheme-to-phoneme conversion. Phonetic units include symbolic representations of sound units to be eventually combined and output by the system as speech. Various sound units may be used for dividing text for purposes of speech synthesis. In some implementations, the TTS model 1260 may process speech based on phonemes (individual sounds), half-phonemes, di-phones (the last half of one phoneme coupled with the first half of the adjacent phoneme), bi-phones (two consecutive phonemes), syllables, words, phrases, sentences, or other units. Each word may be mapped to one or more phonetic units. Such mapping may be performed using a language dictionary stored by the system, for example in a storage component. The linguistic analysis performed by the preprocessing component 1220 may also identify different grammatical components such as prefixes, suffixes, phrases, punctuation, syntactic boundaries, or the like. Such grammatical components may be used by the TTS component 780/880 to craft a natural-sounding audio waveform output. The language dictionary may also include letter-to-sound rules and other tools that may be used to pronounce previously unidentified words or letter combinations that may be encountered by the TTS component 780/880. Generally, the more information included in the language dictionary, the higher quality the speech output.

The output of the preprocessing component 1220 may be a symbolic linguistic representation, which may include a sequence of phonetic units. In some implementations, the sequence of phonetic units may be annotated with prosodic characteristics. In some implementations, prosody may be applied in part or wholly by a TTS model 1260. This symbolic linguistic representation may be sent to the TTS model 1260 for conversion into audio data (e.g., in the form of Mel-spectrograms or other frequency content data format).

The TTS component 780/880 may retrieve one or more previously trained and/or configured TTS models 1260 from the voice profile storage 1285. A TTS model 1260 may be, for example, a neural network architecture that may be described as interconnected artificial neurons or "cells" interconnected in layers and/or blocks. In general, neural network model architecture can be described broadly by hyperparameters that describe the number of layers and/or blocks, how many cells each layer and/or block contains, what activations functions they implement, how they interconnect, etc. A neural network model includes trainable parameters (e.g., "weights") that indicate how much weight (e.g., in the form of an arithmetic multiplier) a cell should give to a particular input when generating an output. In some implementations, a neural network model may include other features such as a self-attention mechanism, which may determine certain parameters at run time based on inputs rather than, for example, during training based on a loss calculation. The various data that describe a particular TTS model 1260 may be stored in the voice profile storage 1285. A TTS model 1260 may represent a particular speaker identity and may be conditioned based on speaking style, emotion, etc. In some implementations, a particular speaker identity may be associated with more than one TTS model 1260; for example, with a different model representing a different speaking style, language, emotion, etc. in some implementations, a particular TTS model 1260 may be associated with more than one speaker identity; that is, be able to produce synthesized speech that reproduces voice characteristics of more than one character. Thus a first TTS model 1260*a* may be used to create synthesized speech for the first speech-processing system 120*a* while a second, different, TTS model 1260*b* may be used to create synthesized speech for the second speech-processing system 120*b*. In some cases, the TTS model 1260 may generate the desired voice characteristics based on conditioning data received or determined from the text data 1215 and/or the other input data 1225. For example a synthesized voice of the first speech-processing system 120*a* may be different from a synthesized voice of the second speech-processing system 120*b*.

The TTS component 780/880 may, based on an indication received with the text data 1215 and/or other input data 1225, retrieve a TTS model 1260 from the voice profile storage 1285 and use it to process input to generate synthesized speech. The TTS component 780/880 may provide the TTS model 1260 with any relevant conditioning labels to generate synthesized speech having the desired voice characteristics. The TTS model 1260 may generate spectrogram data 1245 (e.g., frequency content data) representing the synthesized speech, and send it to the vocoder 1290 for conversion into an audio signal.

The TTS component 780/880 may generate other output data 1255. The other output data 1255 may include, for example, indications or instructions for handling and/or outputting the synthesized speech. For example, the text data 1215 and/or other input data 1225 may be received along with metadata, such as SSML tags, indicating that a selected portion of the text data 1215 should be louder or quieter. Thus, the other output data 1255 may include a volume tag that instructs the vocoder 1290 to increase or decrease an amplitude of the output speech audio data 1295 at times corresponding to the selected portion of the text data 1215. Additionally or alternatively, a volume tag may instruct a playback device to raise or lower a volume of the synthesized speech from the device's current volume level, or lower a volume of other media being output by the device (e.g., to deliver an urgent message).

The vocoder 1290 may convert the spectrogram data 1245 generated by the TTS model 1260 into an audio signal (e.g., an analog or digital time-domain waveform) suitable for amplification and output as audio. The vocoder 1290 may be, for example, a universal neural vocoder based on Parallel WaveNet or related model. The vocoder 1290 may take as input audio data in the form of, for example, a Mel-spectrogram with 80 coefficients and frequencies ranging from 50 Hz to 12 kHz. The synthesized speech audio data 1295 may be a time-domain audio format (e.g., pulse-code modulation (PCM), waveform audio format (WAV), μ-law, etc.) that may be readily converted to an analog signal for amplification and output by a loudspeaker. The synthesized speech audio data 1295 may consist of, for example, 8-, 16-, or 24-bit audio having a sample rate of 16 kHz, 24 kHz, 44.1 kHz, etc. In some implementations, other bit and/or sample rates may be used.

Various machine learning techniques may be used to train and operate models to perform various steps described herein, such as user recognition, sentiment detection, image processing, dialog management, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 13:
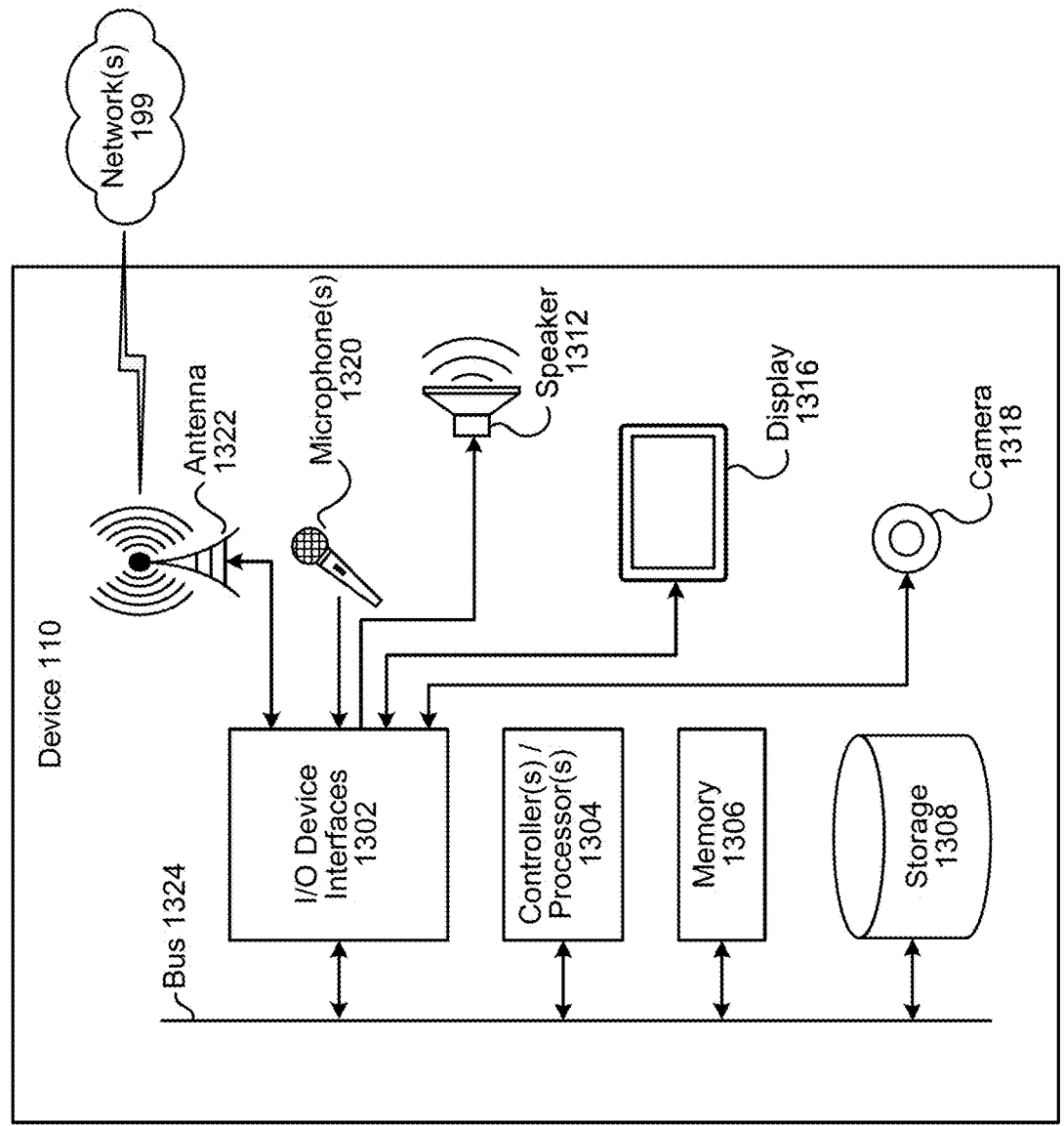
FIG. 13 is a block diagram conceptually illustrating example components of a device, according to embodiments of the present disclosure.
Figure 14:
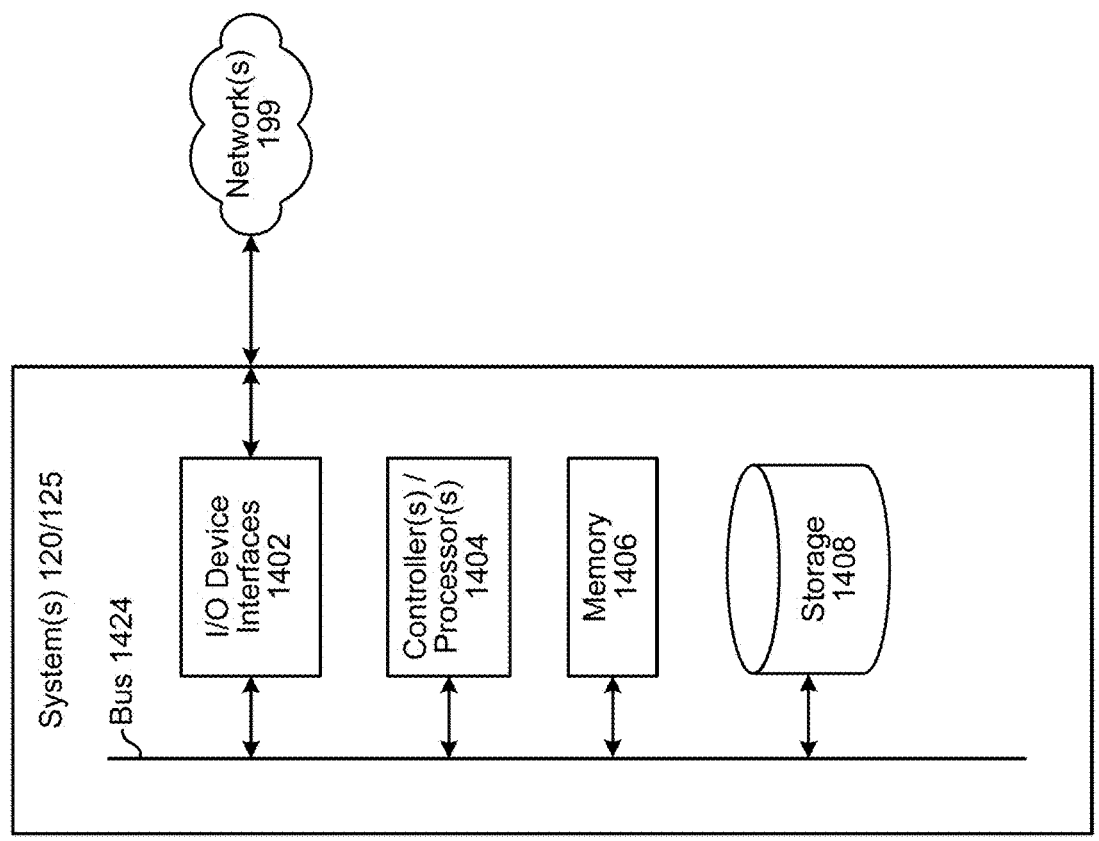
FIG. 14 is a block diagram conceptually illustrating example components of a system, according to embodiments of the present disclosure.

FIG. 13 is a block diagram conceptually illustrating a device 110 that may be used with the system. FIG. 14 is a block diagram conceptually illustrating example components of a remote device, such as the natural language command processing system 120, which may assist with ASR processing, NLU processing, etc., and a skill system 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

While the device 110 may operate locally to a user (e.g., within a same environment so the device may receive inputs and playback outputs for the user) the server/system 120 may be located remotely from the device 110 as its operations may not require proximity to the user. The server/system 120 may be located in an entirely different location from the device 110 (for example, as part of a cloud computing system or the like) or may be located in a same environment as the device 110 but physically separated therefrom (for example a home server or similar device that resides in a user's home or business but perhaps in a closet, basement, attic, or the like). The supporting device 120 may also be a version of a user device 110 that includes different (e.g., more) processing capabilities than other user device(s) 110 in a home/office. One benefit to the server/system 120 being in a user's home/business is that data used to process a command/return a response may be kept within the user's home, thus reducing potential privacy concerns.

Multiple systems (120/125) may be included in the overall system 100 of the present disclosure, such as one or more natural language processing systems 120 for performing ASR processing, one or more natural language processing systems 120 for performing NLU processing, one or more skill systems 125, etc. In operation, each of these systems may include computer-readable and computer-executable instructions that reside on the respective device (120/125), as will be discussed further below.

Each of these devices (110/120/125) may include one or more controllers/processors (1304/1404), which may each include a central processing unit (CPU) for processing data and computer-readable instructions, and a memory (1306/1406) for storing data and instructions of the respective device. The memories (1306/1406) may individually include volatile random access memory (RAM), non-volatile read only memory (ROM), non-volatile magnetoresistive memory (MRAM), and/or other types of memory. Each device (110/120/125) may also include a data storage component (1308/1408) for storing data and controller/processor-executable instructions. Each data storage component (1308/1408) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (1302/1402).

Computer instructions for operating each device (110/120/125) and its various components may be executed by the respective device's controller(s)/processor(s) (1304/1404), using the memory (1306/1406) as temporary "working" storage at runtime. A device's computer instructions may be stored in a non-transitory manner in non-volatile memory (1306/1406), storage (1308/1408), or an external device(s). Alternatively, some or all of the executable instructions may be embedded in hardware or firmware on the respective device in addition to or instead of software.

Each device (110/120/125) includes input/output device interfaces (1302/1402). A variety of components may be connected through the input/output device interfaces (1302/1402), as will be discussed further below. Additionally, each device (110/120/125) may include an address/data bus (1324/1424) for conveying data among components of the respective device. Each component within a device (110/120/125) may also be directly connected to other components in addition to (or instead of) being connected to other components across the bus (1324/1424).

Referring to FIG. 13, the device 110 may include input/output device interfaces 1302 that connect to a variety of components such as an audio output component such as a speaker 1312, a wired headset or a wireless headset (not illustrated), or other component capable of outputting audio. The device 110 may also include an audio capture component. The audio capture component may be, for example, a microphone 1320 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1316 for displaying content. The device 110 may further include a camera 1318.

Via antenna(s) 1322, the input/output device interfaces 1302 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1302/1402) may also include communication components that allow data to be exchanged between devices such as different physical servers in a collection of servers or other components.

The components of the device(s) 110, the natural language command processing system 120, or a skill system 125 may include their own dedicated processors, memory, and/or storage. Alternatively, one or more of the components of the device(s) 110, the natural language command processing system 120, or a skill system 125 may utilize the I/O interfaces (1302/1402), processor(s) (1304/1404), memory (1306/1406), and/or storage (1308/1408) of the device(s) 110, natural language command processing system 120, or the skill system 125, respectively. Thus, the ASR component 750 may have its own I/O interface(s), processor(s), memory, and/or storage; the NLU component 760 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the natural language command processing system 120, and a skill system 125, as described herein, are illustrative, and may be located as a stand-alone device or may be included, in whole or in part, as a component of a larger device or system. As can be appreciated, a number of components may exist either on a system 120 and/or on device 110. For example, language processing 792/892 (which may include ASR 750/850), language output 793/893 (which may include NLG 779/879 and TTS 780/880), etc., for example as illustrated in FIGS. 7 and 8. Unless expressly noted otherwise, the system version of such components may operate similarly to the device version of such components and thus the description of one version (e.g., the system version or the local version) applies to the description of the other version (e.g., the local version or system version) and vice-versa.

Figure 15:
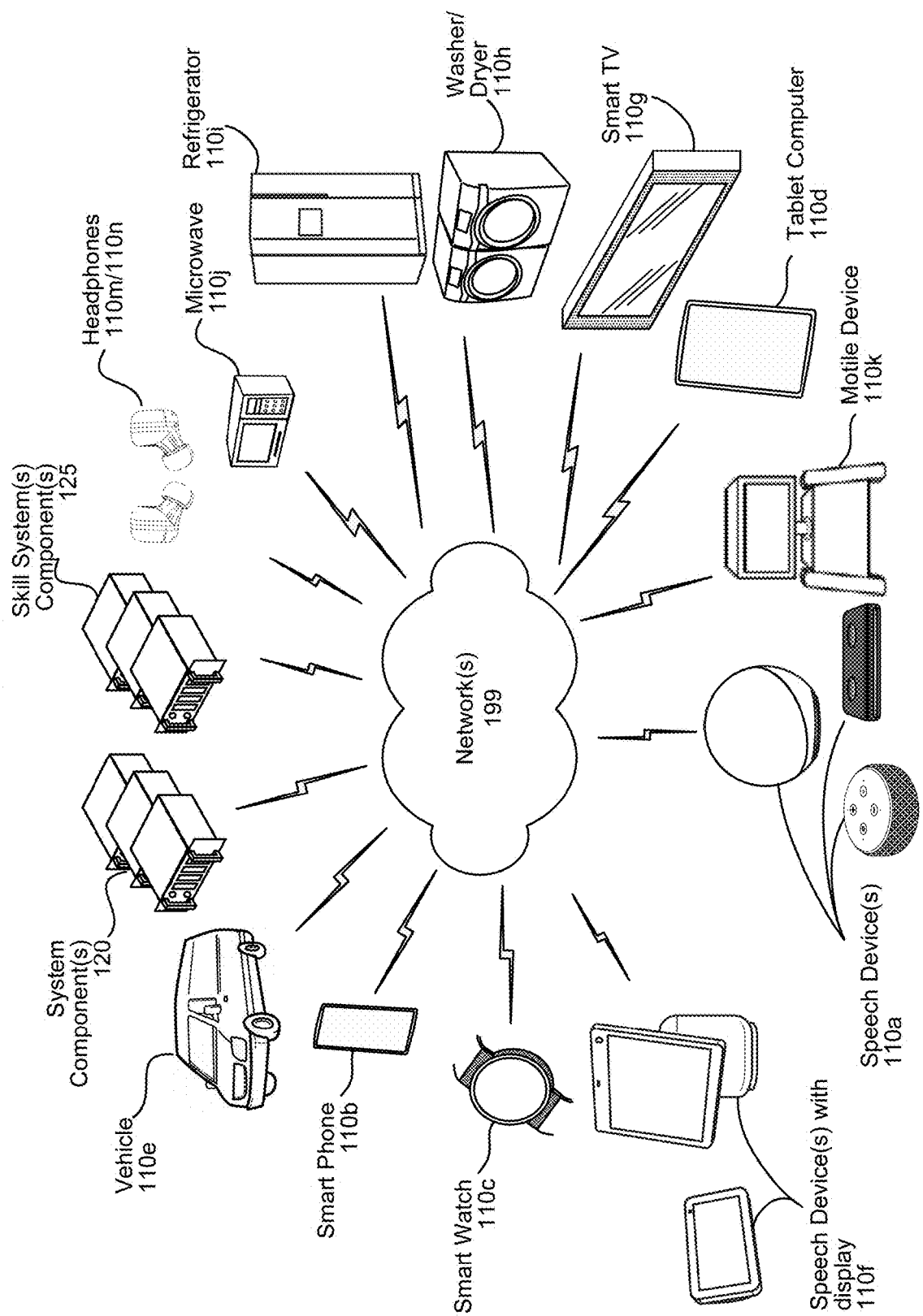
FIG. 15 illustrates an example of a computer network for use with the overall system, according to embodiments of the present disclosure.

As illustrated in FIG. 15, multiple devices (110a-110n, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, speech-detection devices 110a, a smart phone 110b, a smart watch 110c, a tablet computer 110d, a vehicle 110e, speech-detection device(s) with displays 110f, a display/smart television 110g, a washer/dryer 110h, a refrigerator 110i, a microwave 110j, autonomously motile device 110k (e.g., a robot), etc., may be connected to the network(s) 199 through a wireless service provider, over a Wi-Fi or cellular network connection, or the like. Other devices are included as network-connected support devices, such as the natural language command processing system 120, the skill system(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 750, the NLU component 760, etc. of the natural language command processing system 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
    receiving a user input to install a first application on a device;
    receiving first data corresponding to the first application;
    configuring the first application for operation on the device;
    processing the first data to determine the first application is configured to process speech processing output data with regard to a first intent;
    storing second data associating the first application and the first intent;
    sending, from the device to at least one component remote from the device, a first indication corresponding to the first application being configured for operation on the device;
    after storing the second data, receiving first audio data corresponding to a first utterance;
    performing speech processing by the device using the first audio data to determine first speech processing results data, the first speech processing results data representing the first intent;
    determining the first intent is represented in the second data;
    in response to the first speech processing results data representing the first intent and the first intent being represented in the second data, sending the first speech processing results data to the first application;
    receiving, from the first application, first output data responsive to the first utterance; and causing presentation of the first output data using the device.

2. The computer-implemented method of claim 1, further comprising, after sending the first indication, by the at least one component remote from the device:
receiving the first indication;
storing third data associating the first application, the device, and the first intent;
receiving, from the device, second audio data corresponding to a second utterance;
performing speech processing using the second audio data to determine second speech processing results data, the second speech processing results data representing the first intent;
determining the first intent is represented in the third data; and
in response to the second speech processing results data representing the first intent and the first intent being represented in the third data, sending the second speech processing results data to the first application operating on the device.

3. The computer-implemented method of claim 1, further comprising:
determining the first application corresponds to automatic speech recognition (ASR) model data to be used to detect at least one word associated with the first application; and
configuring a first ASR component of the device using the ASR model data to determine an updated ASR component,
wherein performing the speech processing uses the updated ASR component.

4. The computer-implemented method of claim 3, further comprising, after causing presentation of the first output data:
receiving a second user input to disable the first application on the device;
storing third data indicating the first application is disabled with respect to speech processing results data with regard to the first intent;
sending, to the at least one component remote from the device, a second indication corresponding to the first application being disabled with respect to the device; and
determining a further updated ASR component of the device, wherein the further updated ASR component is not configured to use the ASR model data.

5. A computer-implemented method comprising:
receiving a user input resulting in activation of a first application implemented on a user device, the user device configured to perform speech processing;
determining the first application is configured to process a first type of speech processing results data;
sending, from the user device, a first indication corresponding to the first application being configured for operation on the user device;
receiving audio data representing a first utterance;
performing speech processing using the audio data to determine first speech processing results data;
determining that the first speech processing results data corresponds to the first type of speech processing results data; and
sending, to the first application operating on the user device, the first speech processing results data.

6. The computer-implemented method of claim 5, further comprising:
determining the first application corresponds to first model data to be used for speech processing associated with the first application; and
configuring a first speech processing component using the first model data to determine an updated speech processing component,
wherein performing the speech processing uses the updated speech processing component.

7. The computer-implemented method of claim 5, wherein the first type of speech processing results data corresponds to at least a first intent and wherein determining that the first speech processing results data corresponds to the first type of speech processing results data comprises determining that the first speech processing results data represents the first intent.

8. The computer-implemented method of claim 5, further comprising:
sending, from the user device to at least one component remote from the user device, the audio data,
wherein performing speech processing comprises processing the audio data using at least one speech processing component remote from the user device, and
wherein sending the first speech processing results data comprises sending the first speech processing results data from the at least one component remote from the user device to the user device.

9. The computer-implemented method of claim 5, further comprising:
determining the first application corresponds to first model data to be used by a speech synthesis component to create a synthesized speech response associated with the first application;
configuring a speech synthesis component using the first model data to determine an updated speech synthesis component;
determining, by the first application, first output data responsive to the first utterance;
processing the first output data using the updated speech synthesis component to determine output audio data representing a first synthesized speech response to the first utterance; and
causing, by at least one loudspeaker of the user device, presentation of output audio corresponding to the output audio data.

10. The computer-implemented method of claim 5, further comprising:
determining that the first speech processing results data further corresponds to a second type of speech processing results data corresponding to a second application; and
determining context data corresponding to an operating condition of the user device,
wherein sending the first speech processing results data to the first application is based at least in part on the context data.

11. The computer-implemented method of claim 5, further comprising, after sending the first speech processing results data:
determining the first application has been disabled on the user device; and
sending a second indication corresponding to the first application being disabled with respect to the user device.

12. The computer-implemented method of claim 5, further comprising:
processing the audio data to determine the first utterance was spoken by a first user; and determining the first user is permitted to operate the first application,
wherein sending the first speech processing results data to the first application is based at least in part on the first user being permitted to operate the first application.

13. A system, comprising:
at least one processor; and
at least one memory comprising instructions that, when executed by the at least one processor, cause the system to:
receive a user input resulting in activation of a first application implemented on a user device, the user device configured to perform speech processing;
determine the first application is configured to process a first type of speech processing results data;
send, from the user device, a first indication corresponding to the first application being configured for operation on the user device;
receive audio data representing a first utterance;
perform speech processing using the audio data to determine first speech processing results data;
determine that the first speech processing results data corresponds to the first type of speech processing results data; and
send, to the first application operating on the user device, the first speech processing results data.

14. The system of claim 13, wherein the at least one memory further includes instructions that, when executed by the at least one processor, further cause the system to:
determine the first application corresponds to first model data to be used for speech processing associated with the first application; and
configure a first speech processing component using the first model data to determine an updated speech processing component,
wherein performance of the speech processing uses the updated speech processing component.

15. The system of claim 13, wherein the first type of speech processing results data corresponds to at least a first intent and wherein the instructions that cause the system to determine that the first speech processing results data corresponds to the first type of speech processing results data comprise instructions that, when executed by the at least one processor, cause the system to determine that the first speech processing results data represents the first intent.

16. The system of claim 13, wherein the at least one memory further includes instructions that, when executed by the at least one processor, further cause the system to:
send, from the user device to at least one component remote from the user device, the audio data,
wherein performance of the speech processing comprises processing the audio data using at least one speech processing component remote from the user device, and
wherein the instructions that cause the system to send the first speech processing results data comprise instructions that, when executed by the at least one processor, cause the system to send the first speech processing results data from the at least one component remote from the user device to the user device.

17. The system of claim 13, wherein the at least one memory further includes instructions that, when executed by the at least one processor, further cause the system to:
determine the first application corresponds to first model data to be used by a speech synthesis component to create a synthesized speech response associated with the first application;
configure a speech synthesis component using the first model data to determine an updated speech synthesis component;
determine, by the first application, first output data responsive to the first utterance;
process the first output data using the updated speech synthesis component to determine output audio data representing a first synthesized speech response to the first utterance; and
cause, by at least one loudspeaker of the user device, presentation of output audio corresponding to the output audio data.

18. The system of claim 13, wherein the at least one memory further includes instructions that, when executed by the at least one processor, further cause the system to:
determine that the first speech processing results data further corresponds to a second type of speech processing results data corresponding to a second application; and
determine context data corresponding to an operating condition of the user device,
wherein the instructions that cause the system to send the first speech processing results data to the first application are based at least in part on the context data.

19. The system of claim 13, wherein the at least one memory further includes instructions that, when executed by the at least one processor, further cause the system to, after sending the first speech processing results data:
determine the first application has been disabled on the user device; and
send a second indication corresponding to the first application being disabled with respect to the user device.

20. The system of claim 13, wherein the at least one memory further includes instructions that, when executed by the at least one processor, further cause the system to:
process the audio data to determine the first utterance was spoken by a first user; and
determine the first user is permitted to operate the first application,
wherein the instructions that cause the system to send the first speech processing results data to the first application are based at least in part on the first user being permitted to operate the first application.

* * * * *